United States Patent
Li et al.

(10) Patent No.: US 12,242,415 B2
(45) Date of Patent: Mar. 4, 2025

(54) MULTI-CORE PROCESSOR, MULTI-CORE PROCESSOR PROCESSING METHOD, AND RELATED DEVICE

(71) Applicant: Huawei Technologies Co., Ltd., Shenzhen (CN)

(72) Inventors: Guozhu Li, Shenzhen (CN); Xinwei Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/897,295

(22) Filed: Aug. 29, 2022

(65) Prior Publication Data

US 2022/0414052 A1    Dec. 29, 2022

Related U.S. Application Data

(63) Continuation of application No. PCT/CN2020/077354, filed on Feb. 29, 2020.

(51) Int. Cl.
*G06F 15/80* (2006.01)
*G06F 9/30* (2018.01)
*G06F 9/445* (2018.01)

(52) U.S. Cl.
CPC .......... *G06F 15/80* (2013.01); *G06F 9/30043* (2013.01); *G06F 9/44505* (2013.01)

(58) Field of Classification Search
CPC ... G06F 15/80; G06F 9/30043; G06F 9/44505
See application file for complete search history.

(56) References Cited

U.S. PATENT DOCUMENTS

| | | | |
|---|---|---|---|
| 8,176,282 B2 | 5/2012 | Bouvier | |
| 8,527,970 B1 | 9/2013 | Luecke | |
| 10,713,213 B2* | 7/2020 | Tamir | G06F 8/47 |
| 2013/0286839 A1 | 10/2013 | Mirani et al. | |
| 2017/0031728 A1* | 2/2017 | Zhao | G06F 9/52 |
| 2017/0123775 A1 | 5/2017 | Xu et al. | |
| 2018/0095792 A1 | 4/2018 | Chien | |
| 2019/0034350 A1* | 1/2019 | Lemay | G06F 12/1009 |
| 2020/0110587 A1* | 4/2020 | Morgan | G06F 9/30043 |
| 2020/0192676 A1* | 6/2020 | Pearce | G06F 9/3836 |

FOREIGN PATENT DOCUMENTS

| | | |
|---|---|---|
| CN | 1758229 A | 4/2006 |
| CN | 101299199 A | 11/2008 |
| CN | 101464807 A | 6/2009 |
| CN | 104714843 A | 6/2015 |
| CN | 107918557 A | 4/2018 |

* cited by examiner

*Primary Examiner* — Zachary K Huson
(74) *Attorney, Agent, or Firm* — Conley Rose, P.C.

(57) ABSTRACT

A multi-core processor includes a primary processor core and a secondary processor core coupled to the primary processor core. The primary processor core has first instruction space, and the secondary processor core has second instruction space. The primary processor core is configured to execute a first code segment in a target program, where the target program further includes a second code segment, the first code segment is a code segment compatible with the first instruction space, and the second code segment is a code segment compatible with the second instruction space, and send an address of the second code segment to the secondary processor core through a configuration interface of the secondary processor core.

20 Claims, 7 Drawing Sheets

MULTI-CORE PROCESSOR, MULTI-CORE PROCESSOR PROCESSING METHOD, AND RELATED DEVICE

CROSS-REFERENCE TO RELATED APPLICATIONS

This is a continuation of International Patent Application No. PCT/CN2020/077354 filed on Feb. 29, 2020, which is hereby incorporated by reference in its entirety.

TECHNICAL FIELD

This disclosure relates to the field of processor technologies, and in particular, to a multi-core processor, a multi-core processor processing method, and a related device.

BACKGROUND

With continuous research and development in recent years, a multi-core architecture represented by a multi-core processor gradually replaces a single-core processor as a main way to improve processor performance. In a multi-core processor, a plurality of processor cores is integrated in one chip, and the processor cores have same or different functions and structures. The processor cores are integrated in the same chip in an effective manner, and an application program is allocated to different microprocessor cores in an effective division manner for parallel processing, to improve performance of a microprocessor system.

From a perspective of included processor core structures, multi-core processors are classified into homogeneous multi-core processors and heterogeneous multi-core processors. They are two main structural forms of the multi-core processors. All cores inside a homogeneous multi-core processor chip have the same structure, and they are equal. A plurality of cores with different functions are used inside the heterogeneous multi-core processor chip, and usually include a primary core used for management and scheduling and a secondary core used for computing, or include a plurality of cores used for different computing functions such as fixed-point computing, floating-point computing, and special computing. From an application perspective, most current homogeneous multi-core processors include general-purpose processor cores. Each processor core can independently execute a task, and has a structure similar to a structure of a general-purpose single-core processor. A heterogeneous multi-core processor usually integrates a plurality of types of processor cores such as a general-purpose processor (e.g., central processing unit (CPU), a digital signal processor (DSP), a graphics processing unit (GPU), a field-programmable gate array (FPGA), and a network processor. A general-purpose processor core is usually used as a primary core to control another secondary processor core and perform general computing. The other secondary processor core is used to accelerate a specific application to meet different requirements. This improves overall computing performance of the processor.

In conclusion, the heterogeneous multi-core processor may allocate different types of computing tasks to different types of processor cores for parallel processing, to provide a more flexible and efficient processing mechanism for applications with different requirements. However, due to heterogeneity between the plurality of processor cores in the heterogeneous multi-core processor, for example, different structures, different instruction sets, and different interfaces, it is difficult for the primary processor core to flexibly and effectively schedule and control the secondary processor core. Therefore, how to provide a flexible and efficient communications mechanism between processor cores is an urgent problem to be resolved.

SUMMARY

Embodiments of this disclosure provide a multi-core processor, a multi-core processor processing method, and a related device, to improve flexibility and processing efficiency of the multi-core processor.

According to a first aspect, an embodiment of this disclosure provides a multi-core processor, which may include a primary processor core and a secondary processor core coupled to the primary processor core. The primary processor core has first instruction space, and the secondary processor core has second instruction space. The primary processor core is configured to execute a first code segment in a target program, where the target program further includes a second code segment, the first code segment is a code segment compatible with the first instruction space, and the second code segment is a code segment compatible with the second instruction space, and send an address of the second code segment to the secondary processor core through a configuration interface of the secondary processor core. The secondary processor core including the configuration interface is configured to receive the address of the second code segment through the configuration interface, and load the second code segment based on the address of the second code segment, and execute the second code segment.

Embodiments of this disclosure provide a processing architecture and a processing manner, which include designs for hardware and software, that are used for implementing efficient collaboration between a plurality of processor cores in the multi-core processor. From a perspective of the hardware, in this embodiment of this disclosure, a configurable configuration interface is added to each secondary processor core for the primary processor core to configure and control the secondary processor core. From a perspective of the software, the primary processor core executes the first code segment that is compatible with the instruction space of the primary processor core and that is in the target program (the target program includes a plurality of heterogeneous code segments, and includes at least the second code segment), and indicates, to the secondary processor core through the foregoing configuration interface, the address of the second code segment compatible with the instruction space of the primary processor core. In this way, the secondary processor core can execute, by using only independent instruction space and a computing capability that are of the secondary processor core, a task that is in the target program and that is compatible with the secondary processor core. In other words, in the foregoing overall design architecture of the multi-core processor, the primary processor core may control the secondary processor core through the configuration interface, and the secondary processor core executes the code segment by using the independent instruction space of the secondary processor core under control of the primary processor core, so that the primary processor core and one or more secondary processor cores jointly execute the code segment under control of the primary processor core. This implements a function of efficiently executing heterogeneous convergence code in a same processor.

In a possible implementation, the primary processor core is further configured to send, to the secondary processor core through the configuration interface, a status configuration parameter required for executing the second code segment. The secondary processor core is further configured to configure a parameter based on the status configuration parameter received through the configuration interface. In this embodiment of this disclosure, further, the primary processor core configures, through the foregoing configuration interface, a necessary condition (for example, a status parameter of a related register) for the secondary processor core to execute the second code segment, so that the secondary processor core can execute a task that is compatible with the secondary processor core and that is in the target program by using only the independent instruction space and the computing capability that are of the secondary processor core, and does not need to obtain a related condition from the primary processor core in a manner of sharing or occupying the instruction space of the primary processor. In this way, while it is ensured that program logic of the primary processor core and the secondary processor core is unified and self-consistent, instruction space may remain independent of each other, and no semantic conflict occurs. In other words, in the foregoing overall design architecture of the multi-core processor, the primary processor core configures, for the secondary processor core, a necessary status of a related processing component for the secondary processor core to execute a corresponding heterogeneous code segment, and the secondary processor core may execute the code segment by using the independent instruction space of the secondary processor core under control of the primary processor core, so that the primary processor core and the one or more secondary processor cores jointly execute the code segment under control of the primary processor core. This implements the function of efficiently executing the heterogeneous convergence code in the same processor.

In a possible implementation, the primary processor core is further configured to send a code execution instruction to the secondary processor core through the configuration interface. The secondary processor core is further configured to, after receiving the code execution instruction through the configuration interface, load the second code segment based on the address of the second code segment, and execute the second code segment. In this embodiment of this disclosure, after configuring the secondary processor core, the primary processor core may send the code execution instruction to the secondary processor core, to activate the secondary processor core to execute the second code segment.

In a possible implementation, the primary processor core is further configured to configure a task exit condition of the secondary processor core through the configuration interface, where the exit condition includes one or more of a task interrupt condition, a task termination condition, an invalid operation of the secondary processor core, and a priority that the secondary processor core cannot process. The secondary processor core is further configured to determine, in a process of executing the second code segment and based on the task exit condition, whether to stop executing the second code segment. In this embodiment of this disclosure, the primary processor core further configures the exit condition of the secondary processor core through the configuration interface, that is, determines related conditions such as interrupt, termination, the invalid operation, and an inaccessible address of the code in an execution process, so that behavior of the secondary processor core in the process of executing the second code segment is restricted by the primary processor core, that is, under control of the primary processor core, to avoid unauthorized access or out-of-bounds access of the secondary processor core.

In a possible implementation, the second code segment is a task created in a function form in the target program. The primary processor core is further configured to configure, through the configuration interface, the secondary processor core to execute the second code segment in a function calling mode. In this embodiment of this disclosure, the second code segment is used as a part of functions in the target program. When needing to execute the second code segment in a process of executing the target program, the primary processor core configures and calls the secondary processor core in a synchronous function calling mode. It may be understood that, based on an attribute and a feature of the function, when the secondary processor core executes the second code segment, a code segment being executed in the primary processor core and/or another secondary processor core needs to be hung, and execution of code segments that are compatible with other processor cores (including the primary processor core and the other secondary processor core) and that are in the target program are further executed or resumed when execution of the second code segment in the secondary processor core is completed and an execution result is obtained.

In a possible implementation, the second code segment is a task created in a thread form in the target program. The primary processor core is further configured to configure, through the configuration interface, the secondary processor core to execute the second code segment in a thread calling mode. In this embodiment of this disclosure, the second code segment is used as a heterogeneous thread in the target program. When needing to execute the second code segment in a process of executing the target program, the primary processor core configures and calls the secondary processor core in an asynchronous thread calling mode. It may be understood that, based on an attribute and a feature of the thread, when the secondary processor core executes the second code segment, a code segment being executed in the primary processor core and/or another secondary processor core does not need to be hung. In other words, execution of code segments that are compatible with other processor cores (including the primary processor core and the other secondary processor core) and that are in the target program can still be executed in parallel without waiting for execution of the second code segment in the secondary processor core to be completed. It may be understood that the thread and a thread in the primary processor core or the other secondary processor core may belong to a same process, and a plurality of threads may share some resources of a process to which the threads belong.

In a possible implementation, the second code segment is a task created in a process form in the target program. The primary processor core is further configured to configure, through the configuration interface, the secondary processor core to execute the second code segment in a process calling mode. In this embodiment of this disclosure, the second code segment is used as a heterogeneous process in the target program. When needing to execute the second code segment in a process of executing the target program, the primary processor core configures and calls the secondary processor core in an asynchronous process calling mode or a synchronous process calling mode. Further, based on an attribute and a feature of an asynchronous process call, when the secondary processor core executes the second code segment, a code segment being executed in the primary processor core and/or another secondary processor core does not need to be hung. In other words, execution of code segments that are compatible with other processor cores (including the primary processor core and the other secondary processor core) and that are in the target program can still be executed in parallel without waiting for execution of the second code segment in the secondary processor core to be completed. Based on an attribute and a feature of a synchronous process call, when the secondary processor core executes the second code segment, a code segment being executed in the primary processor core and/or another secondary processor core needs to be hung, and execution of code segments that are compatible with other processor cores (including the primary processor core and the other secondary processor core) and that are in the target program are further executed or resumed when execution of the second code segment in the secondary processor core is completed and an execution result is obtained. It may be understood that the process cannot share a related resource with a process in the primary processor core or the other secondary processor core. Therefore, the primary processor core needs to pre-configure a related data structure (page table) of a memory management unit (MMU) for the secondary processor core.

In a possible implementation, the second code segment is a task created in a virtual machine form in the target program. The primary processor core is further configured to configure, through the configuration interface, the secondary processor core to execute the second code segment in a virtual machine calling mode. In this embodiment of this disclosure, the second code segment is used as a heterogeneous virtual machine in the target program. When needing to execute the second code segment in a process of executing the target program, the primary processor core configures and calls the secondary processor core in an asynchronous virtual machine calling mode. Further, based on an attribute and a feature of an asynchronous virtual machine call, when the secondary processor core executes the second code segment, a code segment being executed in the primary processor core and/or another secondary processor core does not need to be hung. In other words, execution of code segments that are compatible with other processor cores (including the primary processor core and the other secondary processor core) and that are in the target program can still be executed in parallel without waiting for execution of the second code segment in the secondary processor core to be completed. Based on an attribute and a feature of a synchronous virtual machine call, when the secondary processor core executes the second code segment, a code segment being executed in the primary processor core and/or another secondary processor core needs to be hung, and execution of code segments that are compatible with other processor cores (including the primary processor core and the other secondary processor core) and that are in the target program are further executed or resumed when execution of the second code segment in the secondary processor core is completed and an execution result is obtained. It may be understood that, before configuring a secondary processor core, the primary processor core needs to load an image of a virtual machine of the secondary processor core into a shared memory. The virtual machine cannot share a related resource with a virtual machine in the primary processor core or the other secondary processor core. Optionally, the primary processor core may further set a physical memory range for the secondary processor core.

In a possible implementation, the status configuration parameter corresponding to the second code segment includes one or more of a configuration parameter that is associated with the second code segment and that is stored in a general-purpose register, a configuration parameter that is associated with the second code segment and that is stored in a system register, and a status setting parameter that affects behavior of running the second code segment by the secondary processor core. In this embodiment of this disclosure, the primary processor core writes, through the configuration interface of the secondary processor core, configuration parameters, for example, types and initial values of some variables, associated with a target code segment into the general-purpose register or the system register, or configures, through the configuration interface, the target secondary processor by using any other status setting parameter that may affect the behavior of running the second code segment by the target secondary processor.

In a possible implementation, the status configuration parameter corresponding to the second code segment is a parameter accessed in an address read/write mode or an instruction control parameter. In this embodiment of this disclosure, a specific configuration mode of the status configuration parameter of the second code segment may be indicating a memory address of a status configuration parameter value to the secondary processor core in an address access mode, so that the secondary processor core reads a corresponding status configuration parameter based on the access address. Optionally, the status configuration parameter may be configured for the secondary processor core in an instruction indication mode, that is, the status configuration parameter value is directly indicated according to an instruction. This is because some types of processor cores are not allowed to be configured in an instruction control mode, that is, an external device does not have permission to control the processor core according to an instruction. Therefore, the foregoing mode may be applicable to chip products with different requirement types.

In a possible implementation, a resource in core and/or a resource off core are/is shared between the primary processor core and the secondary processor core, the resource in core includes a computing resource, and the resource off core includes one or more of a MMU, a cache, and a memory. In this embodiment of this disclosure, the primary processor core and the one or more secondary processor cores may share only the resource in core, only the resource off core, or both of the resource in core and the resource off core. In other words, multi-core processors of different architectures may be designed based on requirements of processors in different architectures. For example, the second code segment may be loaded into the shared memory between the primary processor core and the secondary processor core, that is, both of the primary processor core and the secondary processor core may perform access based on a same access address.

In a possible implementation, the secondary processor core is further configured to store an execution result of the second code segment. The primary processor core is further configured to read the execution result from the secondary processor core through the configuration interface, and continue to execute the target program based on the execution result. In this embodiment of this disclosure, after executing the second code segment, the secondary processor core may store the execution result in an internal register of the secondary processor core, so that the primary processor core subsequently reads, through the configuration interface, the execution result stored in the secondary processor core, and then participates in subsequent execution of the target program.

According to a second aspect, this disclosure provides a multi-core processor processing method, applied to a multi-core processor. The multi-core processor may include a primary processor core and a secondary processor core coupled to the primary processor core, the primary processor core has first instruction space, the secondary processor core has second instruction space, and the method includes executing a first code segment in a target program by using the primary processor core, where the target program further includes a second code segment, the first code segment is a code segment compatible with the first instruction space, and the second code segment is a code segment compatible with the second instruction space, sending an address of the second code segment to the secondary processor core by using the primary processor core, and receiving the address of the second code segment by using the secondary processor core, loading the second code segment based on the address of the second code segment, and executing the second code segment.

In a possible implementation, the method further includes sending, to the secondary processor core by using the primary processor core, a status configuration parameter required for executing the second code segment, and configuring a parameter based on the status configuration parameter received by the secondary processor core.

In a possible implementation, the method further includes sending a code execution instruction to the secondary processor core by using the primary processor core. The loading the second code segment based on the address of the second code segment, and executing the second code segment includes, after receiving the code execution instruction by the secondary processor core, loading the second code segment based on the address of the second code segment, and executing the second code segment.

In a possible implementation, the method further includes configuring a task exit condition of the secondary processor core by using the primary processor core, where the exit condition includes one or more of a task interrupt condition, a task termination condition, an invalid operation of the secondary processor core, and a priority that the secondary processor core cannot process, and in a process of executing the second code segment by using the secondary processor core, determining, based on the task exit condition, whether to stop executing the second code segment.

In a possible implementation, the second code segment is a task created in a function form in the target program, and the method further includes configuring, by using the primary processor core, the secondary processor core to execute the second code segment in a function calling mode.

In a possible implementation, the second code segment is a task created in a thread form in the target program, and the method further includes configuring, by using the primary processor core, the secondary processor core to execute the second code segment in a thread calling mode.

In a possible implementation, the second code segment is a task created in a process form in the target program, and the method further includes configuring, by using the primary processor core, the secondary processor core to execute the second code segment in a process calling mode.

In a possible implementation, the second code segment is a task created in a virtual machine form in the target program, and the method further includes configuring, by using the primary processor core, the secondary processor core to execute the second code segment in a virtual machine calling mode.

In a possible implementation, the status configuration parameter corresponding to the second code segment includes one or more of a configuration parameter that is associated with the second code segment and that is stored in a general-purpose register, a configuration parameter that is associated with the second code segment and that is stored in a system register, and a status setting parameter that affects behavior of running the second code segment by the secondary processor core.

In a possible implementation, the status configuration parameter corresponding to the second code segment is a parameter accessed in an address read/write mode or an instruction control parameter.

In a possible implementation, a resource in core and/or a resource off core are/is shared between the primary processor core and the at least one or more secondary processor cores, the resource in core includes a computing resource, and the resource off core includes one or more of a MMU, a cache, and a memory.

In a possible implementation, the method further includes storing an execution result of the second code segment by using the secondary processor core, and reading the execution result from the secondary processor core by using the primary processor core, and continuing to execute the target program based on the execution result.

According to a third aspect, this disclosure provides a multi-core processor, which may include a primary processor core having first instruction space configured to execute a first code segment in a target program, where the target program further includes a second code segment, the first code segment is a code segment compatible with the first instruction space, and the second code segment is a code segment compatible with second instruction space, and call a secondary processor core that is coupled to the primary processor core and that has the second instruction space to execute the second code segment.

This embodiment of this disclosure provides a processing architecture and a processing manner for implementing efficient collaboration between a plurality of processor cores in the multi-core processor. The primary processor core executes the first code segment that is compatible with the instruction space of the primary processor core and that is in the target program (the target program includes a plurality of heterogeneous code segments, and includes at least the second code segment), and indicates, to the secondary processor core through a configuration interface, an address of the second code segment compatible with the instruction space of the primary processor core. In this way, the secondary processor core can execute, by using only the independent instruction space and a computing capability that are of the secondary processor core, a task that is in the target program and that is compatible with the secondary processor core. In other words, in the foregoing overall design architecture of the multi-core processor, the primary processor core may control and call the secondary processor core, and the secondary processor core executes the code segment by using the independent instruction space of the secondary processor core under control and calling of the primary processor core, so that the primary processor core and one or more secondary processor cores jointly execute the code segment under control of the primary processor core. This implements a function of efficiently executing heterogeneous convergence code in a same processor.

In a possible implementation, the primary processor core is further configured to call, through the configuration interface of the secondary processor core, the secondary processor core to execute the second code segment.

In a possible implementation, the primary processor core is further configured to execute the first code segment in the target program by using the first instruction space. The secondary processor core is further configured to execute the second code segment in the target program by using the second instruction space.

In a possible implementation, the first code segment and the second code segment are code segments obtained through compilation by different compilers.

In a possible implementation, the first instruction space is complex instruction set computing (CISC), and the second instruction space is reduced instruction set computing (RISC).

According to a fourth aspect, this disclosure provides a multi-core processor, applied to a multi-core processor. The multi-core processor includes a primary processor core and a secondary processor core coupled to the primary processor core, the primary processor core has first instruction space, the secondary processor core has second instruction space, and the method includes executing a first code segment in a target program by using the primary processor core, where the target program further includes a second code segment, the first code segment is a code segment compatible with the first instruction space, and the second code segment is a code segment compatible with the second instruction space, calling, by using the primary processor core, the secondary processor core to execute the second code segment, and executing the second code segment in the target program by using the secondary processor core.

In a possible implementation, calling, by using the primary processor core, the secondary processor core to execute the second code segment includes calling, by using the primary processor core and through a configuration interface of the secondary processor core, the secondary processor core to execute the second code segment.

In a possible implementation, executing a first code segment in a target program by using the primary processor core includes executing, by using the primary processor core and the first instruction space, the first code segment in the target program.

Executing the second code segment in the target program by using the secondary processor core includes executing, by using the secondary processor core and the second instruction space, the second code segment in the target program.

In a possible implementation, the first code segment and the second code segment are code segments obtained through compilation by different compilers.

In a possible implementation, the first instruction space is CISC, and the second instruction space is RISC.

According to a fifth aspect, this disclosure provides a semiconductor chip, where the semiconductor chip may include the multi-core processor according to any implementation of the first aspect.

According to a sixth aspect, this disclosure provides a semiconductor chip, where the semiconductor chip may include the multi-core processor according to any implementation of the third aspect.

According to a seventh aspect, this disclosure provides a semiconductor chip, where the semiconductor chip may include the multi-core processor according to any implementation of the first aspect, and an internal memory and an external memory that are coupled to the multi-core processor.

According to an eighth aspect, this disclosure provides a semiconductor chip, where the semiconductor chip may include the multi-core processor according to any implementation of the third aspect, and an internal memory and an external memory that are coupled to the multi-core processor.

According to a ninth aspect, this disclosure provides a system on a chip SoC, where the SoC chip includes the multi-core processor according to any implementation of the first aspect, and an internal memory and an external memory that are coupled to the multi-core processor. The SoC chip may include a chip, or may include a chip and another discrete device.

According to a tenth aspect, this disclosure provides a system on a chip SoC, where the SoC chip includes the multi-core processor according to any implementation of the first aspect, and an internal memory and an external memory that are coupled to the multi-core processor. The SoC chip may include a chip, or may include a chip and another discrete device.

According to an eleventh aspect, this disclosure provides a chip system, where the chip system includes the multi-core processor according to any implementation of the first aspect. In a possible design, the chip system further includes a memory, and the memory is configured to store program instructions and data that are necessary or related to the multi-core processor in a running process. The chip system may include a chip, or may include a chip and another discrete device.

According to a twelfth aspect, this disclosure provides a chip system, where the chip system includes the multi-core processor according to any implementation of the third aspect. In a possible design, the chip system further includes a memory, and the memory is configured to store program instructions and data that are necessary or related to the multi-core processor in a running process. The chip system may include a chip, or may include a chip and another discrete device.

According to a thirteenth aspect, this disclosure provides a processing apparatus, where the processing apparatus has a function of implementing any multi-core processor processing method according to the first aspect. The function may be implemented by hardware, or may be implemented by hardware executing corresponding software. The hardware or the software includes one or more modules corresponding to the function.

According to a fourteenth aspect, this disclosure provides a processing apparatus, where the processing apparatus has a function of implementing any multi-core processor processing method according to the third aspect. The function may be implemented by hardware, or may be implemented by hardware executing corresponding software. The hardware or the software includes one or more modules corresponding to the function.

According to a fifteenth aspect, this disclosure provides a terminal, where the terminal includes a multi-core processor, and the multi-core processor is the multi-core processor according to any implementation of the first aspect. The terminal may further include a memory, and the memory is configured to be coupled to the multi-core processor and stores necessary program instructions and data of the terminal. The terminal may further include a communications interface configured to perform communication between the terminal and another device or communications network.

According to a sixteenth aspect, this disclosure provides a terminal, where the terminal includes a multi-core processor, and the multi-core processor is the multi-core processor according to any implementation of the third aspect. The terminal may further include a memory, and the memory is configured to be coupled to the multi-core processor and stores necessary program instructions and data of the terminal. The terminal may further include a communications interface configured to perform communication between the terminal and another device or communications network.

According to a seventeenth aspect, this disclosure provides a computer-readable storage medium, where the computer-readable storage medium stores a computer program. When the computer program is executed by a multi-core processor, the multi-core processor processing method procedure according to any one of the second aspect is implemented.

According to an eighteenth aspect, this disclosure provides a computer-readable storage medium, where the computer-readable storage medium stores a computer program. When the computer program is executed by a multi-core processor, the multi-core processor processing method procedure according to any one of the fourth aspect is implemented.

According to a nineteenth aspect, an embodiment of this disclosure provides a computer program, where the computer program includes instructions. When the computer program is executed by a multi-core processor, the multi-core processor is enabled to perform the multi-core processor processing method procedure according to any one of the second aspect.

According to a twentieth aspect, an embodiment of this disclosure provides a computer program, where the computer program includes instructions. When the computer program is executed by a multi-core processor, the multi-core processor is enabled to perform the multi-core processor processing method procedure according to any one of the fourth aspect.

DESCRIPTION OF EMBODIMENTS

Figure 1:
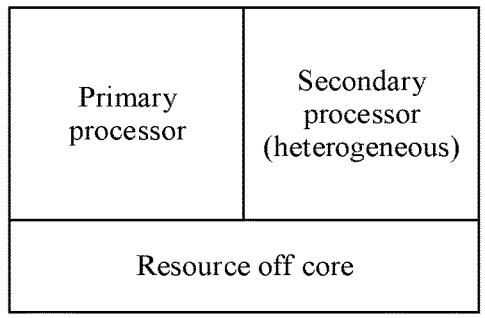
FIG. 1 is a schematic diagram of an architecture of a multi-core processor in a coprocessor mode according to an embodiment of this disclosure.

The following describes embodiments of this disclosure with reference to the accompanying drawings in embodiments of this disclosure. In the specification, the claims, and the accompanying drawings of this disclosure, the terms "first", "second", "third", "fourth", and the like are intended to distinguish between different objects but do not indicate a particular order. In addition, the terms "including", "having", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. "Embodiment" mentioned in this specification means that a particular characteristic, structure, or feature described with reference to embodiments may be included in at least one embodiment of this disclosure. The phrase appear at various locations in this specification may neither necessarily mean a same embodiment, nor mean an independent or optional embodiment exclusive from another embodiment. Persons skilled in the art understand, in explicit and implicit manners, that an embodiment described in this disclosure may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both of a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Some terms in this disclosure are first described, to help persons skilled in the art have a better understanding.

(1) For an application binary interface (ABI), each operating system provides the ABI for an application running on the system. The ABI includes a programming convention that the application needs to comply with when running on the system. The ABI always includes a series of system calls, methods for using the system calls, and regulations on a memory address and a machine register that can be used by the program. From a perspective of the application, the ABI is both of a part of a system architecture and an essential part of a hardware system architecture. Therefore, violation of a constraint of either of the system architecture or the hardware system architecture causes a serious error in the program. In many cases, a linker needs to do some important work to comply with the convention of the ABI. For example, the ABI requires that each application includes all address tables of static data used by routines in the program. The linker creates the address tables by collecting address information of all modules linked to the program. The ABI often affects the linker by defining a standard procedure call.

(2) A general-purpose register can be used to transmit and temporarily store data, participate in arithmetic and logic operations, and save operation results. In addition, each general-purpose register has some special functions.

(3) An intellectual property core (IP core) is short for an integrated circuit core with intellectual property. The IP core is an integrated circuit, device, or component that is pre-designed or even has been verified and that has a specific function. A program is implemented based on hardware description levels of the IP core, the IP core may be divided into three types: a soft core, a hard core and a fixed core.

The soft core mainly describes a function and is submitted to a user in a form of hardware description language (HDL) text.

The fixed core describes a structure, is between the soft core and hard core, and is provided to the user in a form of gate circuit-level netlist.

The hard core is based on physical description, has been verified by a process, and is provided to the user in a form of a circuit physical structure mask plate diagram and a complete set of process documents.

(4) Main functions of a MMU are translating a virtual address (or virtual memory address) to a physical address, controlling access permission, and setting a buffer of virtual storage space.

(5) An FPGA is a product further developed based on programmable devices such as a programmable array logic (PAL) device and a generic array logic (GAL) device. The FPGA emerges as a semi-customized circuit in the application-specific integrated circuit (ASIC) field. The FPGA not only remedies deficiencies of customized circuits, but also overcomes a disadvantage that a quantity of gate circuits in an original programmable device is limited.

(6) For a pointer, in the C language, variables are stored in a memory. The memory is an array including a group of ordered bytes. Each byte has a unique memory address. A CPU locates, through memory addressing, an address of a specified data object stored in the memory. The data object refers to a numeric value or a string of a specified data type stored in the memory. Each data object has its own address, and the pointer is a variable that stores the address. In other words, the pointer is a variable that stores a variable address.

(7) For a multi-core processor, due to a limitation of the semiconductor technology, it is no longer practical to manufacture a high-performance single-core processor. In addition, there is no solution to power consumption and heat dissipation problems brought by the high-performance single-core processor. In this case, more semiconductor manufacturers tend to manufacture the multi-core processor with lower power consumption and balanced performance to improve comprehensive performance of the processor. Multi-core processors can be classified into homogeneous multi-core processors and heterogeneous multi-core processors based on whether core architectures are the same.

(8) An integrated circuit (IC) is a micro electronic device or component. Traces and components such as transistors, resistors, capacitors, and inductors required in a circuit are interconnected by using a given process. The traces and the components are made on a small or several small semiconductor wafers or dielectric substrates, and then encapsulated in a tube shell to form a micro structure with a required circuit function. In other words, an IC chip is a chip made by placing an integrated circuit formed by a large quantity of micro-electronic components (the transistors, the resistors, and the capacitors) on a plastic base.

(9) Computer instructions are instructions and commands that instruct a machine to operate. A program is a series of instructions arranged in a given sequence. A process of executing the program is a working process of a computer. An instruction set is a set of instructions used to compute and control a computer system in a CPU. Each CPU is designed with a series of instruction systems that match its hardware circuits. Instruction strength is also an important indicator of the CPU, the instruction set is one of most effective tools to improve efficiency of a microprocessor. Common instruction set architectures (ISA) include CISC and RISC. A typical representative of the CISC is X86, and a typical representative of the RISC is an advanced RISC machine (ARM) architecture and a microprocessor without an interlocked pipeline stages (microprocessor without interlocked pipelined stages (MIPS)) architecture.

(10) Instruction space is a set of all instructions. Because an instruction is represented as a number, a value range of the number in a modern CPU is usually fixed, and there are many length constraints even if the value range is not fixed. The constraints determine that there is a limit on a quantity of instructions. In a CPU design, the instruction space is a valuable resource because the instruction space needs to be allocated not only to instructions used by the current CPU itself, but also to future, past, and possible instructions. This greatly restricts a quantity of instructions that can be used. If the space is forcibly expanded, CPU decoding costs are increased. Therefore, the instruction space is an important design constraint of the CPU architecture design. It should be noted that, the instruction space and an instruction set represent a same concept, but emphasize different design limitations. The instruction set emphasizes semantics formed by all instructions and an expression capability thereof, and the instruction space emphasizes a quantity of instructions and various engineering implementation costs caused by the quantity.

(11) A halt instruction is a pause instruction that causes a processor to enter a pause state. In the pause state, a CPU does not perform any operation, and the instruction does not affect any flag. When the halt instruction is executed, an IP is frozen on hardware and a program is halted until the processor exits the pause state.

(12) A process is usually defined as execution of a program. The process may be considered as an independent program with complete data space and code space in a memory. Data and variables owned by the process belong only to the process itself.

(13) A thread is a program that runs independently in a process. In other words, the thread exists in the process. One process includes one or more threads. The threads share same code and same global data, but each thread has its own stack. Since there is one stack per thread, each thread has private local variables. Because all threads share the same code and the same global data, the threads are closer than processes, tend to interact more closely than the individual processes, and interact more easily between the threads because the threads themselves have some shared memory for communication: global data of the process.

First, to facilitate understanding of embodiments of this disclosure, a technical problem to be resolved in this disclosure is further analyzed and provided. An implementation of a multi-core processor includes a plurality of technical solutions, and the following two examples are listed.

Solution 1: Technical Solution of a Coprocessor Mode:

FIG. 1 is a schematic diagram of an architecture of a multi-core processor in a coprocessor mode according to an embodiment of this disclosure. In a coprocessor solution in this mode, a secondary processor is designed as a coprocessor of a primary processor, and two systems share same instruction space and a same resource off core (for example, structures such as an MMU, a bus, a cache, and the like).

Figure 2:
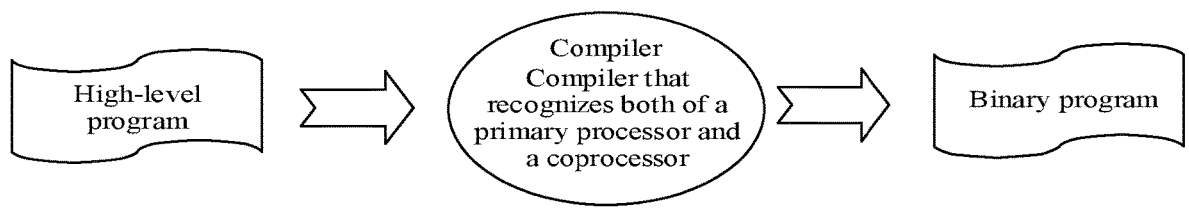
FIG. 2 is another schematic flowchart of translating a high-level program into an instruction recognizable by a processor according to an embodiment of this disclosure.

FIG. 2 is another schematic flowchart of translating a high-level program into an instruction recognizable by a processor according to an embodiment of this disclosure. In this mode, from a perspective of software, a primary processor cannot be distinguished from a secondary processor, and the primary processor and the secondary processor are only different functions of a same processor. An instruction of the secondary processor needs to be added to a compiler of the primary processor. After instructions of the secondary processor and the primary processor are cross-used, it is difficult to isolate the primary processor from the secondary processor by using a software solution. A floating-point coprocessor is used as an example. Diversity of the floating-point coprocessor brings a heavy burden to a compiler. Usually, the compiler needs to process a plurality of different coprocessor types by defining different platform parameters and compiling different binary programs. Therefore, coprocessor changes in a project are diversified, and compiler versions are also diversified. As a result, generated binary programs are incompatible with each other.

Figure 3:
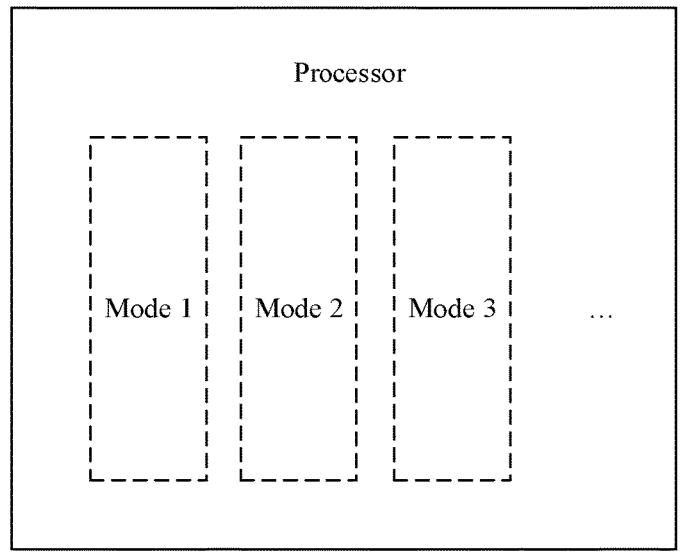
FIG. 3 is a schematic diagram of an architecture of a multi-core processor in a multi-mode processor mode according to an embodiment of this disclosure.

Disadvantages of the solution 1: A disadvantage of the coprocessor mode is that the secondary processor needs to occupy the instruction space of the primary processor (if the coprocessor has a function similar to a function of the primary processor, a large quantity of repeated instructions cannot be borne by the primary processor), and the coprocessor cannot run in parallel with the primary processor. In addition, there are a large quantity of statuses on the coprocessor. As a result, when performing thread switching, the primary processor needs to back up more statuses.
Solution 2: Technical Solution of a Multi-Mode Mode:

FIG. 3 is a schematic diagram of an architecture of a multi-core processor in a multi-mode processor mode according to an embodiment of this disclosure. A plurality of different modes (such as a mode 1, a mode 2, a mode 3, . . . , and the like) may exist on a same processor. A multi-core processor in the multi-mode mode is an improvement of a coprocessor mode. To save instruction space, a coprocessor is set as a "mode" of a primary processor. This is only optimization of the instruction space, and there is no obvious change in hardware. For example, a thumb instruction (a thumb instruction set is a subset of an ARM instruction set) in an RISC microprocessor architecture is considered as a typical case of the multi-mode mode.

Disadvantages of the solution 2: The multi-mode mode improves a problem of insufficient instruction space, but still has a problem that the coprocessor cannot run in parallel with the primary processor. In addition, in an actual implementation, a "mode change" usually means that the two processors are considered as a same processor, and there is a plurality of shared concepts. This solution is usually not suitable for a multi-core processor that has its own concept space.

In conclusion, technical defects in the conventional technology mainly include the following aspects.

1. Whether there is independent instruction space between the primary processor and the secondary processor.

2. Whether the primary processor and the secondary processor can run in parallel.

3. There are status backup issues between the primary processor and the secondary processor.

Therefore, technical problems to be resolved by this disclosure may include the following.

1. The primary processor and the secondary processor may share a computing capability of each other, but may still maintain their own independent instruction space. 2. The primary processor can, but not necessarily, run in parallel with the secondary processor. 3. A status on the secondary processor does not need to be backed up on the primary processor.

Figure 4:
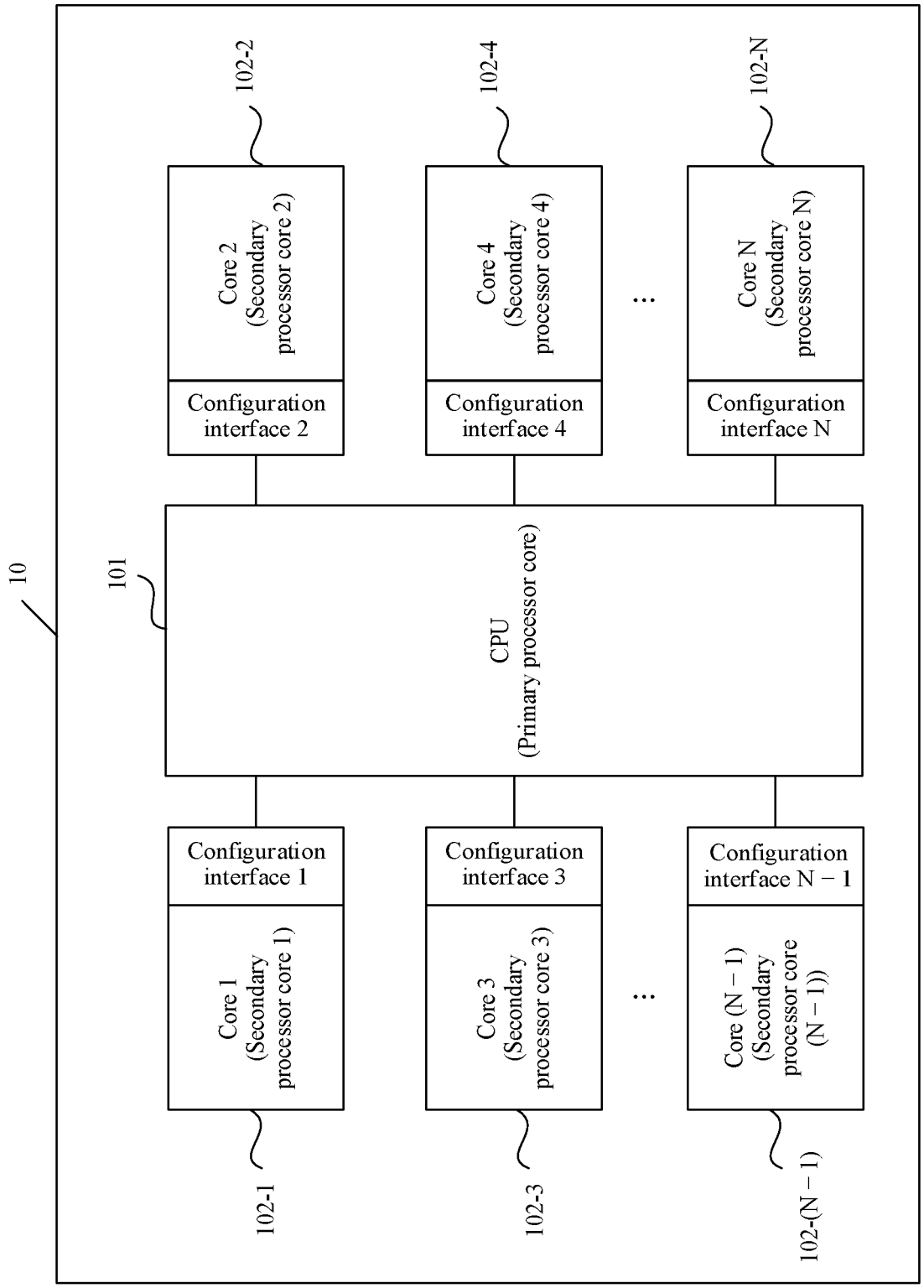
FIG. 4 is a schematic diagram of a structure of a multi-core processor according to an embodiment of this disclosure.

Based on the foregoing description, this disclosure provides a multi-core processor. FIG. 4 is a schematic diagram of a structure of a multi-core processor according to an embodiment of this disclosure. The multi-core processor 10 may be located in any electronic device, for example, various devices such as a computer, a mobile phone, or a tablet computer. The multi-core processor 10 may be further a chip, a chip set, or a circuit board on which a chip or a chip set is mounted. The chip, the chip set, or the circuit board on which a chip or a chip set is mounted may work when being driven by necessary software.

Figure 5:
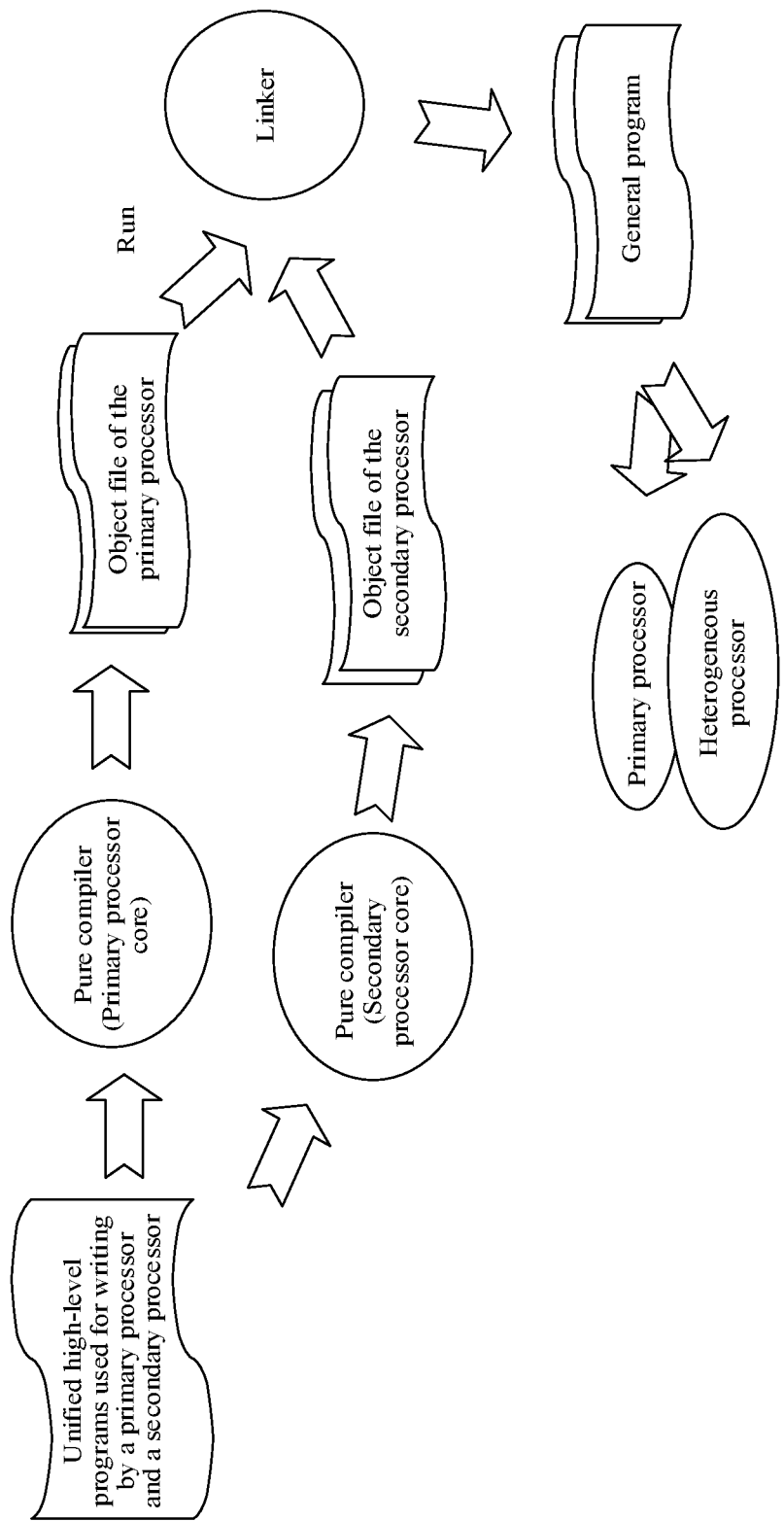
FIG. 5 is a schematic flowchart of comprehensive compilation of a heterogeneous program according to an embodiment of this disclosure.

The multi-core processor 10 may include a primary processor core 101, and one or more secondary processor cores 102 coupled to the primary processor core 101. In FIG. 5, N secondary processor cores 102 are used as an example, and include a secondary processor core 1, a secondary processor core 2, a secondary processor core 3, a secondary processor core 4, . . . , a secondary processor core (N−1)), and a secondary processor core N. The N secondary processor cores 102 all include configuration interfaces, which are: a configuration interface 1, a configuration interface 2, a configuration interface 3, . . . , a configuration interface N−1, and a configuration interface N. The primary processor core 101 may perform related configuration and control on the corresponding secondary processor core 102 through the configuration interface. Optionally, the primary processor core 101 and the one or more secondary processor cores 102 may be located in one or more ICs. For example, the primary processor core 101 and the one or more secondary processor cores 102 may be located in one IC. Alternatively, the primary processor core 101 is located in one IC, and some or all of the one or more secondary processor cores 102 are located in another IC. This is not limited in this embodiment of this disclosure. It may be understood that the primary processor core 101 and the N secondary processor cores 102 may communicate with each other through coupling by using a bus or in another manner. A connection relationship shown in FIG. 4 does not constitute a limitation on a coupling relationship between the primary processor core 101 and the N secondary processor cores 102.

The primary processor core 101 and the N secondary processor cores 102 each have independent instruction space. The primary processor core 101 has first instruction space, and the secondary processor core 102 has second instruction space. In other words, the primary processor core 101 and the secondary processor cores 102 do not share the instruction space with each other, do not occupy the instruction space of each other, and do not conflict with each other in instructions. Optionally, the primary processor core 101 and any secondary processor core 102 of the N secondary processor cores 102 are heterogeneous. In other words, the first instruction space of the primary processor core 101 is different from second instruction space of the any secondary processor core 102. The N secondary processor cores 102 may be homogeneous or heterogeneous, or may be partially homogeneous or partially heterogeneous. In other words, the second instruction space respectively owned by the N secondary processor cores 102 may be the same or different, or may be partially the same or partially different. This is not limited in this embodiment of this disclosure. For example, in an application scenario, the primary processor core 101 is a general-purpose processor core, and the N secondary processor cores 102 are processor cores with a plurality of specific functions. For example, the primary processor core is a general-purpose CPU, and the secondary processor cores 102 are a GPU, an FPGA, a DSP, and the like. In other words, each secondary processor core 102 has a unique structure. Therefore, each secondary processor core has a unique instruction set, and a specific instruction set determines a specific application of each secondary processor core, so that each secondary processor core has a type of program (namely, different code segments in this disclosure) that the secondary processor core is good at processing. Therefore, the primary processor core 101 may allocate different types of computing tasks to different types of secondary processor cores 102 for parallel processing. Therefore, functions of different specific applications are implemented in a same processor at the same time, to provide a more flexible and efficient processing mechanism for applications with different requirements. Optionally, the first instruction space is CISC, and the second instruction space is RISC. For example, both of the primary processor core 101 and the N secondary processor cores 102 are CPU cores, but support different instruction sets. For example, the primary processor core 101 supports an X86 instruction set, and the secondary processor core 102 supports an ARM instruction set. Therefore, the primary processor core 101 may be configured to install and run a general-purpose computer operating system such as a WINDOWS operating system or a LINUX operating system, which may also be referred to as a desktop operating system. The secondary processor core 102 may run, under control of the primary processor core 101, an application based on the ARM instruction set, for example, a general-purpose mobile terminal application such as ANDROID or IOS, which may also be referred to as an application based on an embedded operating system. In other words, the primary processor core 101 on which a computer operating system is installed may be configured to support a general-purpose computer application, and the secondary processor core 202 that supports the ARM instruction set may be configured to support a general-purpose mobile device application under control of the primary processor core, so that functions of both of a personal computer (PC) end and a mobile end are implemented in a same processor, namely, the multi-core processor 10.

Based on the foregoing software and hardware architectures of the multi-core processor, in this embodiment of this disclosure, functions further implemented by the multi-core processor 10 may include the following.

The primary processor core 101 is configured to execute a first code segment in a target program, where the target program includes a plurality of heterogeneous code segments, the plurality of heterogeneous code segments include at least the first code segment and a second code segment, and the first code segment is a code segment compatible with the first instruction space of the primary processor core 101, and send a status configuration request to a target secondary processor core through a target configuration interface of the target secondary processor core, where the status configuration request includes an address of the second code segment. Optionally, the status configuration request further includes a status configuration parameter required for executing the second code segment, the one or more secondary processor cores 102 include the target secondary processor core 102-4-4 (it is assumed that the target secondary processor core is a secondary processor core 102-4 in FIG. 6, the number is used as an example subsequently, and details are not described again), and the second code segment is compatible with second instruction space of the target secondary processor core 102-4. The target secondary processor core 102-4 is configured to receive the status configuration request through the target configuration interface (namely, a configuration interface 4 in FIG. 6, which is not described again subsequently), configure a parameter based on the status configuration parameter, load the second code segment based on an instruction pointer of the second code segment, and execute the second code segment. It should be noted that, in this embodiment of this disclosure, a sequence of executing the first code segment by the primary processor core 101 and executing the second code segment by the target secondary processor core 102-4, and a quantity of code segments (for example, there are a plurality of first code segments or a plurality of second code segments) are not limited. It may be understood that the first code segment and the second code segment may also be executed in parallel.

Further, when the multi-core processor 10 executes, by using the primary processor core 101, a heterogeneously converged executable target program, and needs to execute a second code segment (the second code segment is a compiled executable code segment), the primary processor core 101 may select the matched target secondary processor core 102-4 from a plurality of secondary processor cores 102 coupled to the primary processor core 101, and send a related configuration request to the target secondary processor core 102-4 through the target configuration interface 4 of the target secondary processor core 102-4 by using the primary processor core 101, to indicate, to the target secondary processor core 102-4, an address of the second code segment that needs to be executed, and an initial environment, a prerequisite, and the like for executing the second code segment, so that the target secondary processor core 102-4 executes, under control of the primary processor core 101, the second code segment that is compatible with the target secondary processor core 102-4. The target program includes a plurality of heterogeneous code segments, and the plurality of heterogeneous code segments are binary programs that are separately obtained by different compilers through compilation and that are compatible with different instruction space. For example, the target program includes a binary program (an executable code segment) compatible with the X86 instruction set, a binary program (an executable code segment) compatible with the ARM instruction set, a binary program (an executable code segment) compatible with an MIPS instruction set, and the like. The first code segment is the binary program compatible with the X86 instruction set, and the second code segment is the binary program compatible with the ARM instruction set or the binary program compatible with the MIPS instruction set. The target secondary processor core is a secondary processor core that is of the one or more secondary processor cores and that is compatible with the second code segment. In other words, the instruction space of the target secondary processor core is compatible with the second code segment. Further, the address of the second code segment is the instruction pointer of the second code segment. For example, when each instruction fetch cycle arrives, the target secondary processor core may fetch an instruction from an address to which the instruction pointer points, and add 1 to the instruction pointer to point to an address of a next instruction, until the second code segment is executed completely. Optionally, the status configuration parameter corresponding to the second code segment includes one or more of a configuration parameter that is associated with the second code segment and that is stored in a general-purpose register of the target secondary processor core, a configuration parameter that is associated with the second code segment and that is stored in a system register of the target secondary processor core, and a status setting parameter that affects behavior of running the second code segment by the target secondary processor. For example, the configuration parameter stored in the general-purpose register is data related to a common operation, for example, a type and an initial value of a variable, and the configuration parameter stored in the system register is system-related data, for example, a global variable and a global clock. However, some status parameters may affect the computation behavior of running the second code segment by the target secondary processor core 102-4, but the second code segment is not necessarily presented as a register. For example, addition is performed, and there is carry in the addition. The processor core needs to remember a status of the carry, the carry is added in next addition, and the carry may not be necessarily a register. The status configuration parameter may also include the foregoing status setting parameter.

It should be noted that, because the primary processor core 101 needs to perform status configuration for the target secondary processor core 102-4 through the target configuration interface, in this embodiment of this disclosure, the primary processor core 101 needs to master related features of an ABI and a register of each of the one or more secondary processor cores 102. In this way, the primary processor core can set the status configuration parameter for the secondary processor core based on the related feature and a programming convention when the primary processor core needs to call the secondary processor core. The secondary processor core can execute the second code segment by using only the instruction space of the secondary processor core, and does not need to obtain, in a manner of sharing or occupying the instruction space of the primary processor core, the related status configuration parameter required for executing the second code segment.

For how the foregoing heterogeneously converged executable target program is obtained through compilation, an embodiment of this disclosure provides a specific solution. FIG. 5 is a schematic flowchart of comprehensive compilation of a heterogeneous program according to an embodiment of this disclosure. For the foregoing mode, unified high-level programs (for example, programs including a plurality of programming languages) used for writing by a primary processor core and a secondary processor core are first provided, respective pure compilers (including a compiler corresponding to the primary processor core and a compiler corresponding to the secondary processor core) are used to compile the unified high-level programs into respective independent object files (an object file of the primary processor core and an object file of the secondary processor core), and then a linker is used to link the respective independent object files to generate a general program, namely, the target program in this embodiment of this disclosure. In other words, software of the primary processor core and the secondary processor core may be independently compiled by respective corresponding compilers, and then integrated into the target program by using the link (for example, in a form of calling a function, creating a thread, creating a process, or creating a virtual machine). The object file is, for example, a .o file. The .o file is a type of redirectable file, and is usually stored in an executable and linkable format (ELF). The .o file includes entry marks and description of functions. When a program needs to be executed, a link is further required. The link is to link a plurality of .o files to generate one executable file. When being compiled together, a plurality of programming languages can be compiled into .o files, and then linked to generate an executable file. It may be understood that, a compilation process of the target program in this embodiment of this disclosure may be performed in the multi-core processor 101 (for example, in the primary processor core), or may be performed on an apparatus or a device other than the multi-core processor 101, that is, provided that compilers respectively corresponding to the foregoing plurality of programming languages are included. A specific compilation location is not limited in this embodiment of this disclosure.

In this embodiment of this disclosure, interfaces of the primary processor core and the secondary processor core are designed in a standardized manner, so that a plurality of cores of the multi-core processor are logically integrated when processing software, and a to-be-executed target program has a complete and unified software execution environment. Regardless of whether the secondary processor core is called by using an accelerator or is directly switched to other instruction space for running, the configuration interface of the processor core may be used for implementation, so that calling of the multi-core processor is equivalent to the form of calling a function, creating a thread, creating a thread, or creating a virtual machine. This implements a solution that the primary processor core can directly manage the secondary processor core without further understanding the secondary processor core.

In a possible implementation, the primary processor core 101 is further configured to send a code execution instruction to the target secondary processor core 102-4 through the target configuration interface 4. The target secondary processor core 102-4 is further configured to, after receiving the code execution instruction through the target configuration interface 4, load the second code segment based on the address (for example, the instruction pointer) of the second code segment, and execute the second code segment. In this embodiment of this disclosure, after configuring the target secondary processor core 102-4, the primary processor core 101 may send the code execution instruction to the target secondary processor core, to activate the target secondary processor core to execute the second code segment. It may be understood that the primary processor core calls the target secondary processor core according to the code execution instruction, and enables the target secondary processor core to run. It may be considered that the code execution instruction simulates call instruction behavior of the primary processor core, but the behavior does not occur on the primary processor core, and does not use an implementation model of the primary processor core.

In a possible implementation, the primary processor core 101 is further configured to configure a task exit condition of the secondary processor core 102 through the target configuration interface, where the exit condition includes one or more of a task interrupt condition, a task termination condition, an invalid operation of the secondary processor core, and a priority that the secondary processor core cannot process. The target secondary processor core 102-4 is further configured to determine, in a process of executing the second code segment and based on the exit condition, whether to stop executing the second code segment. For example, if the target secondary processor core 102-4 encounters a preset task interrupt condition, the target secondary processor core performs an invalid operation (for example, accesses an inaccessible address), or the target secondary processor core enters a specified non-processing priority, the target secondary processor core 102-4 may be enabled to stop executing the process of executing the second code segment. In this embodiment of this disclosure, the primary processor core further configures the exit condition of the target secondary processor core through the target configuration interface, that is, determines related conditions such as interrupt, termination, the invalid operation, and the inaccessible address of the code in an execution process, so that behavior of the target secondary processor core in the process of executing the second code segment is restricted by the primary processor core, that is, under control of the primary processor core, to avoid unauthorized access or out-of-bounds access of the target secondary processor core. Optionally, the primary processor core may wait for the secondary processor core to stop, become abnormal, or fall into a specific status, and then continue another operation. Alternatively, the primary processor core continues its own operation until the secondary processor core terminates, and asynchronously notifies the primary processor core to perform a next operation.

Embodiments of this disclosure provide a processing architecture and a processing manner, which include designs for hardware and software, that are used for implementing efficient collaboration between a plurality of processor cores in the multi-core processor. From a perspective of the hardware, in this embodiment of this disclosure, a configurable configuration interface is added to each secondary processor core for the primary processor core to configure and control the secondary processor core. From a perspective of the software, the primary processor core executes the first code segment that is compatible with the instruction space of the primary processor core and that is in the target program (the target program includes a plurality of heterogeneous code segments, and includes at least the second code segment), and configures, for the secondary processor core through the foregoing configuration interface, a necessary condition for executing the second code segment. In this way, the target secondary processor core can execute, by using only the independent instruction space and a computing capability that are of the target secondary processor core, a task that is in the target program and that is compatible with the target secondary processor core, and does not need to obtain a related condition from the primary processor core in the manner of sharing or occupying the instruction space of the primary processor. In this way, while it is ensured that program logic of the primary processor core and the target secondary processor core is unified and self-consistent, instruction space may remain independent of each other, and no semantic conflict occurs. In other words, in the foregoing overall design architecture of the multi-core processor, the primary processor core configures, for the secondary processor core, a necessary status for the secondary processor core to execute a corresponding heterogeneous code segment, and the secondary processor core may execute the code segment by using the independent instruction space of the secondary processor core, so that the primary processor core and the one or more secondary processor cores jointly execute the code segment under control of the primary processor core. This implements a function of efficiently executing the heterogeneous convergence code in the same processor.

Figure 6:
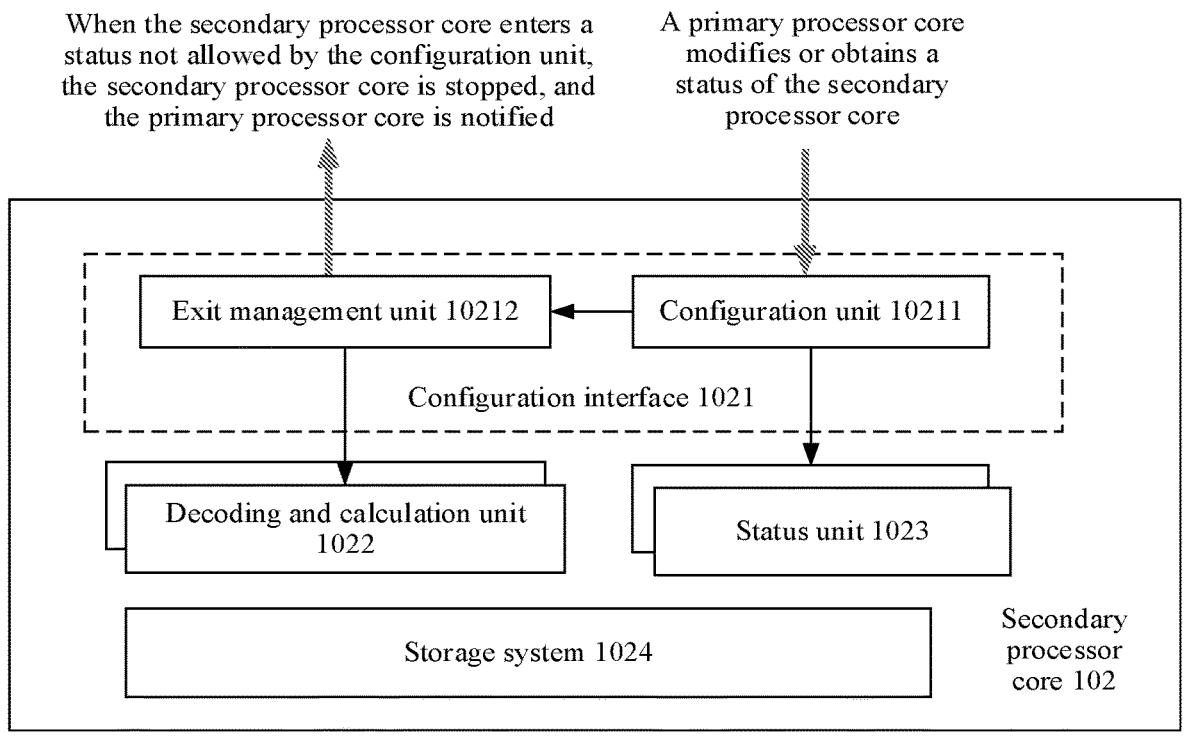
FIG. 6 is a schematic diagram of a structure of a secondary processor core according to an embodiment of this disclosure.

In a possible implementation, an embodiment of this disclosure provides a structure of a secondary processor core for implementing a function of the foregoing configuration interface. FIG. 6 is a schematic diagram of a structure of a secondary processor core according to an embodiment of this disclosure. The secondary processor core 102 includes a configuration interface 1021, one or more decoding and calculation units 1022, one or more status units 1023, and a storage system 1024. The configuration interface 1021 may further include a configuration unit 10211 and an exit management unit 10212. In other words, in this embodiment of this disclosure, the configuration interface 1021 is added to the secondary processor core, so that the primary processor core 101 may change a working status, for example, content in a current register and a privilege level of the secondary processor core, of the secondary processor core by using the configuration unit 10211 in the configuration interface 1021, and then enable the secondary processor core to execute from a preset status according to a "code execution instruction". Further, the configuration unit 10211 may further modify a status and a trap-out management condition of the secondary processor core 102. In other words, the primary processor core 101 may set, through the configuration interface 1021 of the secondary processor core 102, the secondary processor core to any expected status, and stop the secondary processor core when the secondary processor core performs an unauthorized operation, to obtain a current status of the secondary processor core, and then restart the process.

In a possible implementation, the status configuration parameter corresponding to the second code segment is a parameter accessed in an address read/write mode or an instruction control parameter. In this embodiment of this disclosure, a specific configuration mode of the status configuration parameter of the second code segment may be indicating a memory address of a status configuration parameter value to the target secondary processor core in an address access mode, so that the target secondary processor core reads a corresponding status configuration parameter based on the access address. Optionally, the status configuration parameter may be configured for the target secondary processor core in an instruction indication mode, that is, the status configuration parameter value is directly indicated according to an instruction. This is because some types of processor cores are not allowed to be configured in an instruction control mode, that is, an external device does not have permission to control the processor core according to an instruction. Therefore, the foregoing address read/write mode may be applicable to chip products with different requirement types.

Figure 7:
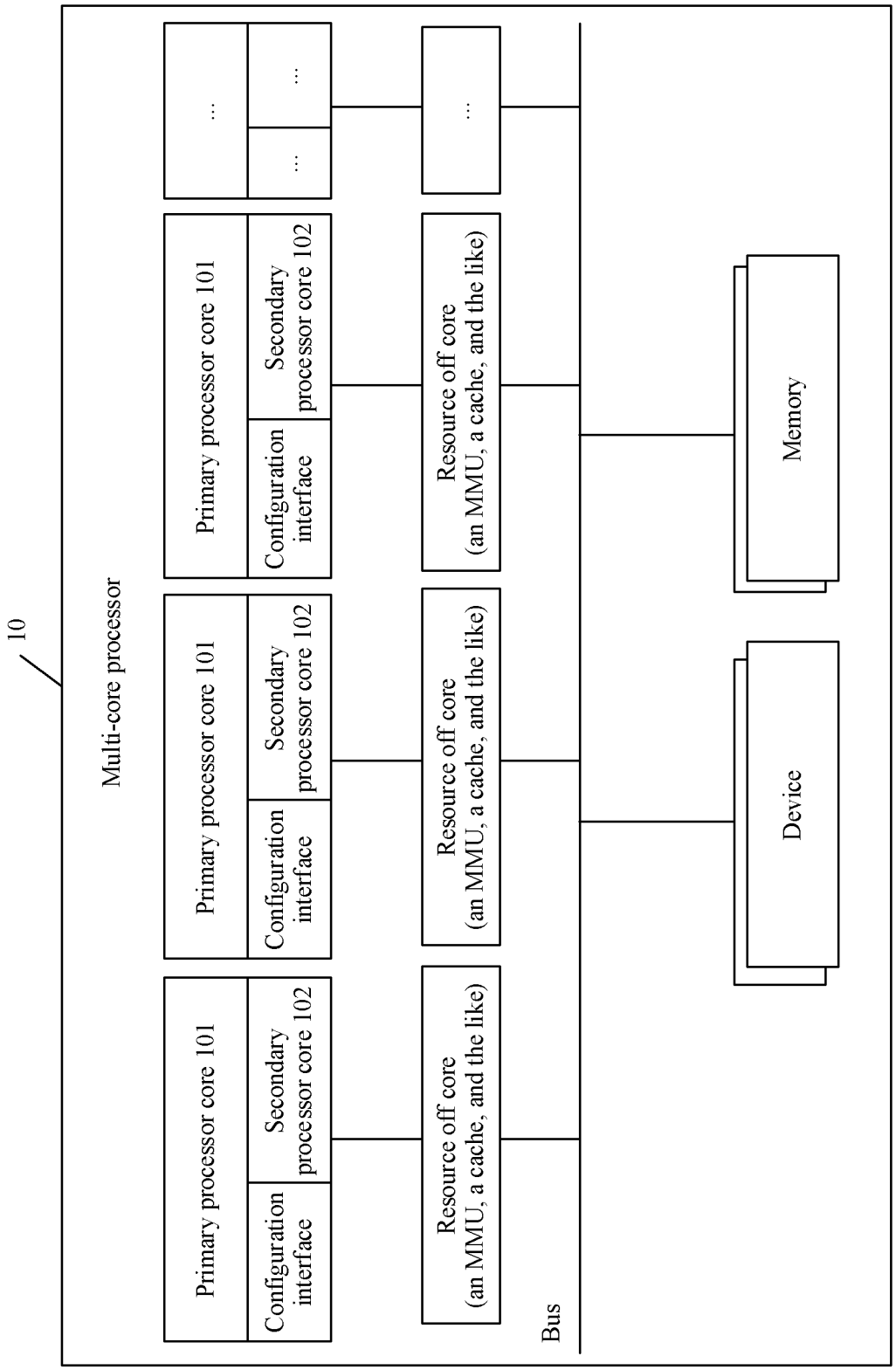
FIG. 7 is a schematic diagram of an architecture in which a multi-core processor shares a resource off core according to an embodiment of this disclosure.
Figure 8:
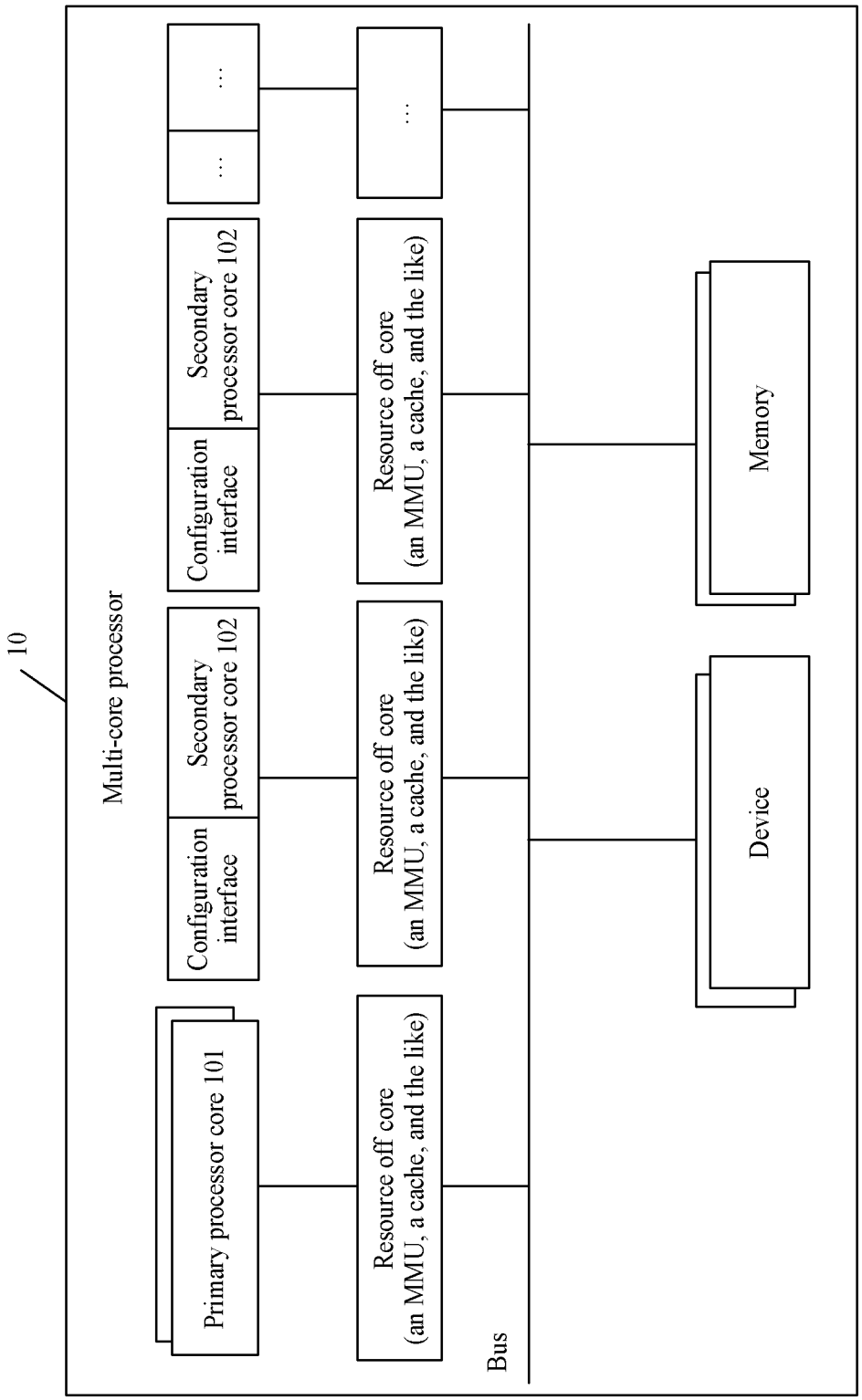
FIG. 8 is a schematic diagram of an architecture in which a multi-core processor exclusively uses a resource off core according to an embodiment of this disclosure.

In a possible implementation, a resource in core and/or a resource off core are/is shared between the primary processor core 101 and the at least one or more secondary processor cores 102, the resource in core includes a computing resource, and the resource off core includes one or more of a memory management unit, a cache, and a memory. In this embodiment of this disclosure, the primary processor core and the one or more secondary processor cores may share only the resource in core, only the resource off core, or both of the resource in core and the resource off core. In other words, multi-core processors of different architectures may be designed based on requirements of processors in different architectures. For example, the second code segment may be loaded into the shared memory between the primary processor core and the secondary processor core, that is, both of the primary processor core and the secondary processor core may perform access based on a same access address. FIG. 7 is a schematic diagram of a structure in which a multi-core processor shares a resource off core according to an embodiment of this disclosure. In this implementation architecture, a plurality of groups of primary processor cores and corresponding secondary processor cores may be included. Each group of primary processor cores and secondary processor cores may be on a same IC and share resource off cores (including an MMU, a cache, and the like). When primary processor cores in a same group need to use computing power of secondary processor cores, the primary processor core calls the secondary processor core through a configuration interface of the secondary processor core, to achieve an objective of unified management of all resources on a multi-architecture computing system. FIG. 8 is a schematic diagram of an architecture in which a multi-core processor exclusively uses a resource off core according to an embodiment of this disclosure. The implementation architecture includes one or more primary processor cores and a plurality of secondary processor cores. The primary processor core may be used for management and scheduling, and the secondary processor core may be used for specific performance acceleration. The one or more primary processor cores and the plurality of secondary processor cores independently own resource off cores (including an MMU, a cache, and the like). When the primary processor core needs computing power of the secondary processor core or needs to run an application that supports the secondary processor core, the primary processor core calls the secondary processor core through a configuration interface of the secondary processor core, to achieve an objective of unified management of all resources on a multi-architecture computing system. Optionally, in the architecture shown in FIG. 7 or FIG. 8, the primary processor core and the secondary processor core may also share a memory, an external device, and the like by using a bus. In other words, in this disclosure, a connection relationship and an architecture between the primary processor core and one or more secondary processor cores are not limited, provided that the primary processor core can access the configuration interface of the secondary processor, and the primary processor core can dynamically modify a status of the secondary processor core through the configuration interface of the secondary processor core.

In a possible implementation, the target secondary processor core 102-4 is further configured to store an execution result of the second code segment. The primary processor core 101 is further configured to read the execution result from the target secondary processor core 102-4 through the target configuration interface 4, and continue to execute the target program based on the execution result. In this embodiment of this disclosure, after executing the second code segment, the target secondary processor core may store the execution result in an internal register of the target secondary processor core, so that the primary processor core subsequently reads, through the configuration interface, the execution result stored in the secondary processor core, and then participates in subsequent execution of the target program.

In a process in which the primary processor core 101 calls the target secondary processor core 102-4 to execute the second code segment, a specific calling procedure and a related configuration procedure vary based on different composition forms of the second code segment in the target program. In this disclosure, based on any architecture of the multi-core processor 10 provided above, a flexible software solution can be supported, and the following four calling manners are included.

Manner 1: The primary processor core calls the target secondary processor core in a function form to execute the second code segment.

The second code segment is a task created in a heterogeneous function form in the target program. The primary processor core 101 is further configured to configure, through the target configuration interface 4, the target secondary processor core 102-4 to execute the second code segment in a synchronous function calling mode. It is assumed that a code segment a (corresponding to the first code segment in this disclosure) of the primary processor core 101 is stored in a memory address A, a code segment b (corresponding to the second code segment in this disclosure) of the target secondary processor core 102-4 is stored in a memory address B, and the primary processor core 101 is executing the code segment a in the target program, and now needs to execute a function in the code segment b. An execution process (namely, a synchronous heterogeneous calling procedure) of the primary processor core 101 is as follows.

1. The primary processor core 101 sets, through the target configuration interface 4 of the target secondary processor core 102-4 and according to an ABI protocol agreed upon with the code segment b, a status (namely, corresponding to the status configuration parameter in the status configuration request in this disclosure) of a related register in the target secondary processor core 102-4.

2. The primary processor core 101 sets an execution pointer (namely, the instruction pointer corresponding to the status configuration request in this disclosure) to B through the target configuration interface 4 of the target secondary processor core 102-4.

3. The primary processor core 101 synchronously calls the target secondary processor core 102-4 through the target configuration interface 4, for example, sends the code execution instruction.

4. The target secondary processor core 102-4 switches from a ready state to a running state, and executes the code segment b.

5. The target secondary processor core 102-4 completes processing, enters a halt instruction, traps out (trapped out), and returns to the ready state.

6. The primary processor core 101 reads, from the configuration interface 4 of the target secondary processor core 102-4, a value returned to the register, and obtains the execution result.

The manner 1 is a same-level software calling manner, namely, the synchronous function calling mode. In the synchronous function calling mode, software libraries of two heterogeneous processor cores (including the primary processor core and the target secondary processor core) are compiled independently. A link program is used for adding synchronous calling bridge code before a function of the target secondary processor core, and setting the register and synchronous calling code in the heterogeneous secondary processor core. In this way, calling of the heterogeneous secondary processor core can achieve same effect as calling of the function.

In conclusion, in the foregoing synchronous function calling mode, the second code segment is used as a part of functions in the target program. When needing to execute the second code segment in a process of executing the target program, the primary processor core configures and calls the target secondary processor core in the synchronous function calling mode. It may be understood that, based on an attribute and a feature of the function, when the target secondary processor core executes the second code segment, a code segment being executed in the primary processor core and/or another secondary processor core needs to be hung, and execution of code segments that are compatible with other processor cores (including the primary processor core and the other secondary processor core) and that are in the target program are further executed or resumed when execution of the second code segment in the target secondary processor core is completed and the execution result is obtained.

Manner 2: The primary processor core calls the target secondary processor core in a thread form to execute the second code segment.

The second code segment is a task created in a heterogeneous thread form in the target program. The primary processor core 101 is further configured to configure, through the target configuration interface 4, the target secondary processor core 102-4 to execute the second code segment in an asynchronous thread calling mode. It is assumed that a code segment a (corresponding to the first code segment in this disclosure) of the primary processor core 101 is stored in a memory address A, a code segment b (corresponding to the second code segment in this disclosure) of the target secondary processor core 102-4 is stored in a memory address B, and the primary processor core 101 is executing the code segment a in the target program, and now needs to execute a function in the code segment b. An execution process (namely, an asynchronous heterogeneous calling procedure) of the primary processor core 101 is as follows.

1. The primary processor core 101 creates a heterogeneous thread, and initializes a status of the target secondary processor core 102-4 (that is, corresponding to the status configuration parameter in the status configuration request in this disclosure) according to a thread protocol.

2. The primary processor core 101 sets an execution pointer (namely, the instruction pointer corresponding to the status configuration request in this disclosure) to B through the target configuration interface 4 of the target secondary processor core 102-4.

3. The primary processor core 101 asynchronously calls the secondary processor core through the configuration interface of the secondary processor core, for example, sends the code execution instruction.

4. The target secondary processor core 102-4 switches from a ready state to a running state, and executes the code segment b.

5. The target secondary processor core 102-4 completes processing or encounters an exception, traps out, and returns to the ready state.

6. The primary processor core 101 enters trap-out exception processing of the target secondary processor core 102-4, to process an end or exception of a thread.

The manner 2 is a same-level software calling manner, namely, an asynchronous thread calling mode. In this mode, a thread library is responsible for adding code to a thread library entry: setting the register, executing an asynchronous call of the target secondary processor core, and calling a function of a heterogeneous library. In this way, the heterogeneous secondary processor core may be represented as a software thread to be used by the primary processor core. If there is more than one heterogeneous core thread, a timer is used to trap out the target secondary processor core, and then a scheduling program of the primary processor core schedules another thread for execution. In a heterogeneous system, threads of an application program may be allocated to different processor cores based on characteristics of the threads by using an operating system (for example, threads including a large quantity of operations are allocated to a processor core that is good at processing an operation instruction, and threads including a large quantity of load/ store instructions are allocated to a processor core that is good at processing a memory access instruction), so that each processor core exerts its own characteristics. In this way, program running efficiency can be improved comprehensively. In addition, a difference in running time between different threads due to characteristics of the threads can be eliminated to some extent.

In conclusion, in the foregoing function calling mode, the second code segment is used as the heterogeneous thread in the target program. When needing to execute the second code segment in a process of executing the target program, the primary processor core configures and calls the target secondary processor core in the asynchronous thread calling mode. It may be understood that, based on an attribute and a feature of the thread, when the target secondary processor core executes the second code segment, a code segment being executed in the primary processor core and/or another secondary processor core does not need to be hung. In other words, execution of code segments that are compatible with other processor cores (including the primary processor core and the other secondary processor core) and that are in the target program can still be executed in parallel without waiting for execution of the second code segment in the target secondary processor core to be completed. It may be understood that the thread and a thread in the primary processor core or the other secondary processor core may belong to a same process, and a plurality of threads may share some resources of a process to which the threads belong.

Manner 3: The primary processor core calls the target secondary processor core in a process form to execute the second code segment.

The second code segment is a task created in a heterogeneous process form in the target program. The primary processor core 101 is further configured to configure, through the target configuration interface 4, the target secondary processor core 102-4 to execute the second code segment in an asynchronous process calling mode or a synchronous process calling mode. It is assumed that a code segment a (corresponding to the first code segment in this disclosure) of the primary processor core 101 is stored in a memory address A, a code segment b (corresponding to the second code segment in this disclosure) of the target secondary processor core 101-4 is stored in a memory address B, and the primary processor core 101 is executing the code segment a in the target program, and now needs to execute a function in the code segment b to cooperate with privilege level control of the primary processor core 101. An execution process (namely, a synchronous heterogeneous calling procedure) of the primary processor core 101 is as follows.

1. The primary processor core 101 loads a process (the second code segment) of the secondary processor core to a memory, and establishes an MMU-related data structure (a page table).

2. The primary processor core 101 sets a privilege level of the secondary processor core to a user mode, and configures any system call. A corresponding task exit condition (trap-out) includes input/output (I/O) access, an MMU exception, and the like.

3. The primary processor core 101 sets a register status (namely, corresponding to the status configuration parameter in the status configuration request in this disclosure) of the secondary processor core according to a process protocol of an architecture of the secondary processor core.

4. The primary processor core 101 sets an execution pointer (namely, the instruction pointer corresponding to the status configuration request in this disclosure) to B through the target configuration interface 4 of the target secondary processor core 102-4. It should be noted that, in a process calling process, the execution pointer (namely, the instruction pointer) may refer to an initial address at which the target secondary processor core 102-4 executes the second code segment. Subsequently, because a process or a virtual machine may enter a cycle (execution→pause→execution-→pause) in a running process, when the target secondary processor core 102-4 returns to an execution state from a pause state, the primary processor core may need to re-indicate the execution pointer to the target secondary processor core 102-4. Certainly, alternatively, the target secondary processor core 102-4 may determine the execution pointer itself. Therefore, the instruction pointer in the status configuration request in this disclosure may point to the initial address of the second code segment in this mode, or may point to an interrupt address when the second code segment subsequently returns to the execution state from the pause state. This is not limited in this embodiment of this disclosure.

5. The primary processor core 101 synchronously calls the secondary processor core in a kernel mode.

6. The secondary processor core 101 enters the running state, and executes a user mode function as a process.

7. The target secondary processor core 102-4 traps out when initiating any system call or system interrupt, or accessing an invalid address.

8. The primary processor core 101 obtains a trap-out reason from the configuration interface of the target secondary processor core 102-4, enters a normal procedure to process a related exception or a system call request, sets a processing result in the register of the target secondary processor core 102-4, and synchronously calls the target secondary processor core 102-4 again or terminates a process of the target secondary processor core 102-4.

The manner 3 is a cross-level simulated calling manner, namely, a synchronous thread calling mode. In this mode, system software (for example, an operating system) of the primary processor core 101 may create a process of the target secondary processor core 102-4. When the process is scheduled, the operating system of the primary processor core 101 may configure infrastructure, for example, the MMU of the primary processor core 101, set a condition so that the target secondary processor core 102-4 traps out when encountering related behavior such as interrupt, a system call, and the like, and turns the process into interrupt processing of the primary processor core 101. In this way, the target secondary processor core 102-4 is enabled to run in a context of the primary operating system. If the target secondary processor core 102-4 shares the computing resource of the primary processor core 101, a synchronization mode can be configured to stop the primary processor core 101 until the target secondary processor core 102-4 traps out. It may be understood that, if the target secondary processor core 102-4 does not need to share the computing resource or a computing result of the primary processor core, an asynchronous mode may be configured, and an asynchronous heterogeneous procedure may be performed in a manner similar to the foregoing synchronous heterogeneous calling procedure.

In conclusion, in the foregoing process calling mode, the second code segment is used as a heterogeneous process in the target program. When needing to execute the second code segment in a process of executing the target program, the primary processor core configures and calls the target secondary processor core in the asynchronous process calling mode or the synchronous process calling mode. Further, based on an attribute and a feature of an asynchronous process call, when the target secondary processor core executes the second code segment, a code segment being executed in the primary processor core and/or another secondary processor core does not need to be hung. In other words, execution of code segments that are compatible with other processor cores (including the primary processor core and the other secondary processor core) and that are in the target program can still be executed in parallel without waiting for execution of the second code segment in the target secondary processor core to be completed. Based on an attribute and a feature of a synchronous process call, when the target secondary processor core executes the second code segment, a code segment being executed in the primary processor core and/or another secondary processor core needs to be hung, and execution of code segments that are compatible with other processor cores (including the primary processor core and the other secondary processor core) and that are in the target program are further executed or resumed when execution of the second code segment in the target secondary processor core is completed and an execution result is obtained. It may be understood that the process cannot share a related resource with a process in the primary processor core or the other secondary processor core. Therefore, the primary processor core needs to pre-configure a related data structure (page table) of a memory management unit MMU for the target secondary processor core.

Manner 4: The primary processor core calls the target secondary processor core in a virtual machine form.

The second code segment is a task created in a heterogeneous virtual machine form in the target program. The primary processor core 101 is further configured to configure, through the target configuration interface 4, the target secondary processor core 102-4 to execute the second code segment in an asynchronous virtual machine calling mode or a synchronous virtual machine calling mode. It is assumed that a code segment a (corresponding to the first code segment in this disclosure) of the primary processor core 101 is stored in a memory address A, a code segment b (corresponding to the second code segment in this disclosure) of the target secondary processor core 102-4 is stored in a memory address B, and the primary processor core 101 is executing the code segment a in the target program, and now needs to execute a function in the code segment b. An execution process (namely, a synchronous heterogeneous calling procedure) of the primary processor core 101 is as follows.

1. A virtual machine monitor (Hypervisor) of the primary processor core 101 loads a system image (which may include a bootloader before system startup) of the secondary processor core into a memory, and may control a physical memory range of the secondary processor core if necessary.

2. The primary processor core 101 sets a privilege level of the target secondary processor core 102-4 to a kernel mode, and configures any hypervisor call, I/O access that needs to be intervened, and time as one of trap-out (trap-out) conditions.

3. The primary processor core 101 sets a register status (including a sending status configuration request in this disclosure) of the secondary processor core according to a process protocol of an architecture of the target secondary processor core 102-4.

4. The primary processor core 101 sets an execution pointer (namely, the instruction pointer corresponding to the status configuration request in this disclosure) to B through the target configuration interface 4 of the target secondary processor core 102-4. It should be noted that, in a virtual machine calling process, the execution pointer (namely, the instruction pointer) may refer to an initial address at which the target secondary processor core 102-4 executes the second code segment. Subsequently, because a process or a virtual machine may enter a cycle (execution→pause→execution→pause) in a running process, when the target secondary processor core 102-4 returns to an execution state from a pause state, the primary processor core may need to re-indicate the execution pointer to the target secondary processor core 102-4. Certainly, alternatively, the target secondary processor core 102-4 may determine the execution pointer itself. Therefore, the instruction pointer in the status configuration request in this disclosure may point to the initial address of the second code segment in this mode, or may point to an interrupt address when the second code segment subsequently returns to the execution state from the pause state. This is not limited in this embodiment of this disclosure.

5. The primary processor core 101 synchronously calls the target secondary processor core 102-4 in a hypervisor mode, for example, sends the code execution instruction.

6. The secondary processor core 101 enters the running state, and executes, as the virtual machine, a function of a virtual machine operating system.

7. When the secondary processor core 101 initiates a hypervisor call, or any I/O event that cannot be processed by the target secondary processor core 102-4 or a system exception event occurs, trap-out is generated.

8. The primary processor core 101 obtains a trap-out reason from the configuration interface of the target secondary processor core 102-4, enters a normal procedure to process a related exception or a system call request, sets a processing result in the register of the target secondary processor core 102-4, and synchronously calls the target secondary processor core 102-4 again or terminates a virtual machine of the target secondary processor core 102-4.

The manner 4 is a cross-level simulated calling mode, namely, a synchronous virtual machine calling mode. In this mode, a running environment of the target secondary processor core 102-4 may be prepared by a hypervisor, and provided that a related trap-out condition is set, the target secondary processor core 102-4 may run as the virtual machine. It may be understood that, an asynchronous mode may also be configured, and an asynchronous heterogeneous procedure may be performed in a manner similar to the foregoing synchronous heterogeneous calling procedure.

In conclusion, in the foregoing virtual machine calling mode, the second code segment is used as a heterogeneous virtual machine in the target program. When needing to execute the second code segment in a process of executing the target program, the primary processor core configures and calls the target secondary processor core in the asynchronous virtual machine calling mode. Further, based on an attribute and a feature of an asynchronous virtual machine call, when the target secondary processor core executes the second code segment, a code segment being executed in the primary processor core and/or another secondary processor core does not need to be hung. In other words, execution of code segments that are compatible with other processor cores (including the primary processor core and the other secondary processor core) and that are in the target program can still be executed in parallel without waiting for execution of the second code segment in the target secondary processor core to be completed. Based on an attribute and a feature of a synchronous virtual machine call, when the target secondary processor core executes the second code segment, a code segment being executed in the primary processor core and/or another secondary processor core needs to be hung, and execution of code segments that are compatible with other processor cores (including the primary processor core and the other secondary processor core) and that are in the target program are further executed or resumed when execution of the second code segment in the target secondary processor core is completed and an execution result is obtained. It may be understood that, before configuring the target secondary processor core, the primary processor core needs to load an image of the virtual machine of the target secondary processor core into a shared memory. The virtual machine cannot share a related resource with a virtual machine in the primary processor core or the other secondary processor core. Optionally, the primary processor core may further set the physical memory range for the target secondary processor core.

In this embodiment of this disclosure, based on heterogeneity of cores in the multi-core processor, application programs with different requirements may be executed simultaneously, to meet different requirements. For example, the multi-core processor in this embodiment of this disclosure may be widely applied to consumer electronic products such as a high-performance computer, a desktop computer, and an intelligent terminal, and various fields such as equipment manufacturing and national defense and military industry.

Figure 9:
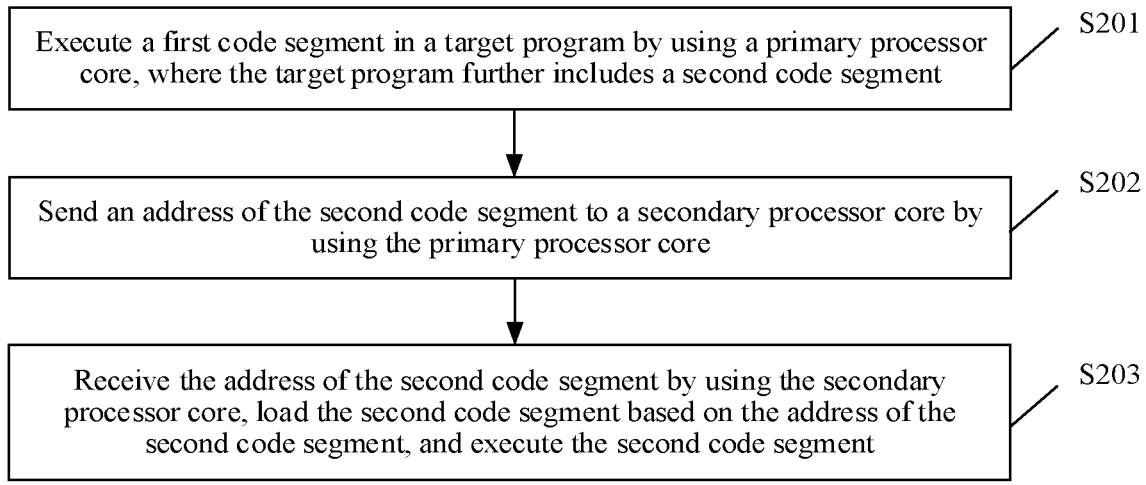
FIG. 9 is a schematic flowchart of a multi-core processor processing method according to an embodiment of this disclosure.

FIG. 9 is a schematic flowchart of a multi-core processor processing method according to an embodiment of this disclosure. The multi-core processor processing method is applied to a multi-core processor. The multi-core processor includes a primary processor core and a secondary processor core coupled to the primary processor core. The primary processor core has first instruction space, and the secondary processor core has second instruction space. In addition, the multi-core processor processing method is applicable to any multi-core processor in FIG. 6 to FIG. 10 and a device (for example, a mobile phone, a computer, or a server) including the multi-core processor. The method may include the following step S201 to step S203.

Step S201: Execute a first code segment in a target program by using the primary processor core, where the target program further includes a second code segment, the first code segment is a code segment compatible with the first instruction space, and the second code segment is a code segment compatible with the second instruction space.

Step S202: Send an address of the second code segment to the secondary processor core by using the primary processor core.

Step S203: Receive the address of the second code segment by using the secondary processor core, load the second code segment based on the address of the second code segment, and execute the second code segment.

In a possible implementation, the method further includes sending, to the secondary processor core by using the primary processor core, a status configuration parameter required for executing the second code segment, and configuring a parameter based on the status configuration parameter received by the secondary processor core.

In a possible implementation, the method further includes sending a code execution instruction to the secondary processor core by using the primary processor core. The loading the second code segment based on the address of the second code segment, and executing the second code segment includes, after receiving the code execution instruction by the secondary processor core, loading the second code segment based on the address of the second code segment, and executing the second code segment.

In a possible implementation, the method further includes configuring a task exit condition of the secondary processor core by using the primary processor core, where the exit condition includes one or more of a task interrupt condition, a task termination condition, an invalid operation of the secondary processor core, and a priority that the secondary processor core cannot process, and in a process of executing the second code segment by using the target secondary processor core, determining, based on the task exit condition, whether to stop executing the second code segment.

In a possible implementation, the second code segment is a task created in a function form in the target program, and the method further includes configuring, by using the primary processor core, the target secondary processor core to execute the second code segment in a function calling mode.

In a possible implementation, the second code segment is a task created in a thread form in the target program, and the method further includes configuring, by using the primary processor core, the target secondary processor core to execute the second code segment in a thread calling mode.

In a possible implementation, the second code segment is a task created in a process form in the target program, and the method further includes configuring, by using the primary processor core, the target secondary processor core to execute the second code segment in a process calling mode.

In a possible implementation, the second code segment is a task created in a virtual machine form in the target program, and the method further includes configuring, by using the primary processor core, the target secondary processor core to execute the second code segment in a virtual machine calling mode.

In a possible implementation, the status configuration parameter corresponding to the second code segment includes one or more of a configuration parameter that is associated with the second code segment and that is stored in a general-purpose register, a configuration parameter that is associated with the second code segment and that is stored in a system register, and a status setting parameter that affects behavior of running the second code segment by the secondary processor core.

In a possible implementation, the status configuration parameter corresponding to the second code segment is a parameter accessed in an address read/write mode or an instruction control parameter.

In a possible implementation, a resource in core and/or a resource off core are/is shared between the primary processor core and the at least one or more secondary processor cores, the resource in core includes a computing resource, and the resource off core includes one or more of a memory management unit, a cache, and a memory.

In a possible implementation, the method further includes storing an execution result of the second code segment by using the secondary processor core, and reading the execution result from the secondary processor core by using the primary processor core, and continuing to execute the target program based on the execution result.

It should be noted that for a specific procedure of the multi-core processor processing method described in this embodiment of this disclosure, refer to related description in embodiments of this disclosure in FIG. 4 to FIG. 8. Details are not described herein again.

Figure 10:
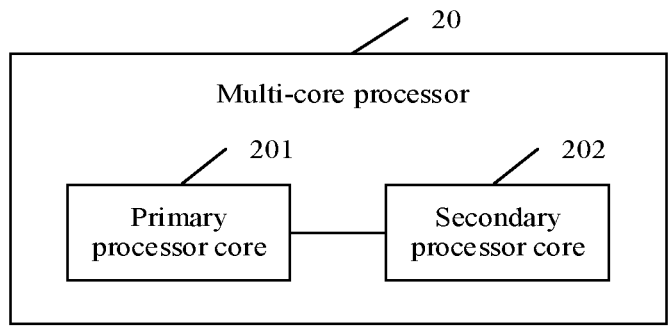
FIG. 10 is a schematic diagram of a structure of another multi-core processor according to an embodiment of this disclosure.

Based on the foregoing description, this disclosure provides a multi-core processor. FIG. 10 is a schematic diagram of a structure of another multi-core processor according to an embodiment of this disclosure. The multi-core processor 20 may include a primary processor core 201 and a secondary processor core 202 (which may include one or more cores, and one core is used as an example in FIG. 10). The multi-core processor 20 may be located in any electronic device, for example, various devices such as a computer, a mobile phone, or a tablet. The multi-core processor 20 may be further a chip, a chip set, or a circuit board on which a chip or a chip set is mounted. The chip, the chip set, or the circuit board on which a chip or a chip set is mounted may work when being driven by necessary software.

The multi-core processor 20 may include the primary processor core 201 having first instruction space configured to execute a first code segment in a target program, where the target program further includes a second code segment, the first code segment is a code segment compatible with the first instruction space, and the second code segment is a code segment compatible with second instruction space, call the secondary processor core 202 that is coupled to the primary processor core 201 and that has the second instruction space to execute the second code segment.

In a possible implementation, the primary processor core 201 is further configured to call, through a configuration interface of the secondary processor core 202, the secondary processor core 202 to execute the second code segment.

In a possible implementation, the primary processor core 201 is further configured to execute the first code segment in the target program by using the first instruction space. The secondary processor core 202 is further configured to execute the second code segment in the target program by using the second instruction space.

In a possible implementation, the first code segment and the second code segment are code segments obtained through compilation by different compilers.

In a possible implementation, the first instruction space is CISC, and the second instruction space is RISC.

It should be noted that for a function of the multi-core processor described in this embodiment of this disclosure, refer to related description in embodiments of this disclosure in FIG. 4 to FIG. 8. Details are not described herein again.

Figure 11:
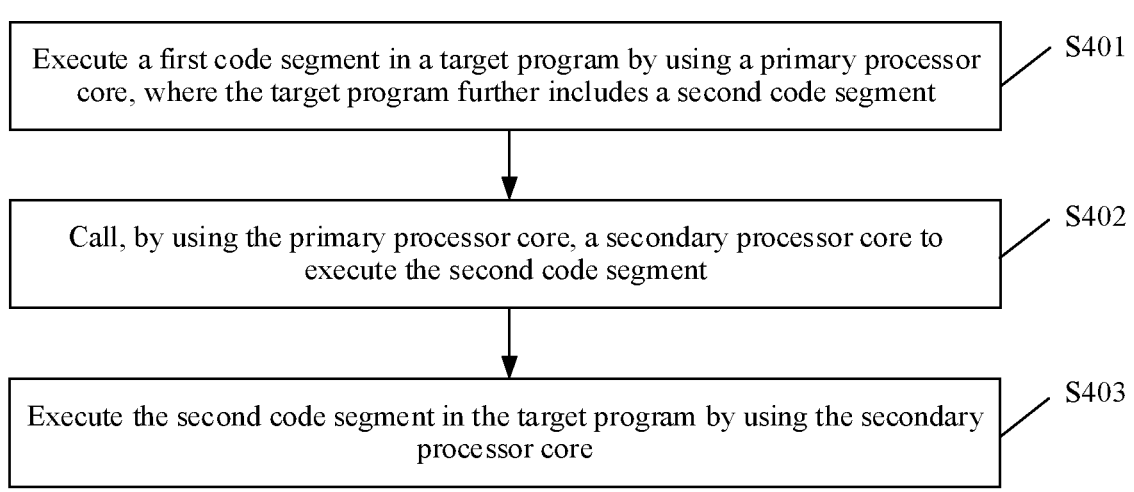
FIG. 11 is a schematic flowchart of another multi-core processor processing method according to an embodiment of this disclosure.

FIG. 11 is a schematic flowchart of another multi-core processor processing method according to an embodiment of this disclosure. The multi-core processor processing method is applied to a multi-core processor. The multi-core processor includes a primary processor core and a secondary processor core coupled to the primary processor core. The primary processor core has first instruction space, and the secondary processor core has second instruction space. In addition, the multi-core processor processing method is applicable to any multi-core processor in FIG. 4 to FIG. 8 and a device (for example, a mobile phone, a computer, or a server) including the multi-core processor. The method may include the following step S401 to step S403.

Step S401: Execute a first code segment in a target program by using the primary processor core, where the target program further includes a second code segment, the first code segment is a code segment compatible with the first instruction space, and the second code segment is a code segment compatible with the second instruction space.

Step S402: Call, by using the primary processor core, the secondary processor core to execute the second code segment.

Step S403: Execute the second code segment in the target program by using the secondary processor core.

In a possible implementation, the calling, by using the primary processor core, the secondary processor core to execute the second code segment includes calling, by using the primary processor core and through a configuration interface of the secondary processor core, the secondary processor core to execute the second code segment.

In a possible implementation, the executing a first code segment in a target program by using the primary processor core includes executing, by using the primary processor core and the first instruction space, the first code segment in the target program.

The executing the second code segment in the target program by using the secondary processor core includes executing, by using the secondary processor core and the second instruction space, the second code segment in the target program.

In a possible implementation, the first code segment and the second code segment are code segments obtained through compilation by different compilers.

In a possible implementation, the first instruction space is CISC, and the second instruction space is RISC.

It should be noted that for a specific procedure of the multi-core processor processing method described in this embodiment of this disclosure, refer to related description in embodiments of this disclosure in FIG. 4 to FIG. 8. Details are not described herein again.

An embodiment of this disclosure further provides a computer-readable storage medium, where the computer-readable storage medium may store a program. When the program is executed by a multi-core processor, some or all of steps described in any one of the foregoing method embodiments are performed.

An embodiment of this disclosure further provides a computer program, where the computer program includes instructions. When the computer program is executed by a multi-core processor, the multi-core processor may be enabled to perform some or all of steps in any multi-core processor processing method.

In the foregoing embodiments, the description of each embodiment has respective focuses. For a part that is not described in detail in an embodiment, refer to related description in another embodiment.

It should be noted that, for brief description, the foregoing method embodiments are represented as a series of actions. However, persons skilled in the art should appreciate that this disclosure is not limited to the described order of the actions, because according to this disclosure, some steps may be performed in another order or simultaneously. It should be further appreciated by persons skilled in the art that embodiments described in this specification all belong to example embodiments, and the involved actions and modules are not necessarily required by this disclosure.

In several embodiments provided in this disclosure, it should be understood that the disclosed apparatuses may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software function unit.

When the foregoing integrated unit is implemented in the form of a software functional unit and sold or used as an independent product, the integrated unit may be stored in a computer-readable storage medium. Based on such an understanding, the technical solutions of this disclosure essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a magnetic disk, an optical disc, a read-only memory (ROM), or a random-access memory (RAM).

The foregoing embodiments are merely intended for describing the technical solutions of this disclosure instead of limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A multi-core processor comprising:
a primary processor core comprising a first instruction space and configured to:
execute a first code segment in a target program, wherein the target program further comprises a second code segment, wherein the first code segment is compatible with the first instruction space; and
send an address of the second code segment; and
a secondary processor core coupled to the primary processor core, comprising a configuration interface and a second instruction space that is compatible with the second code segment, and configured to:
receive the address through the configuration interface;
load the second code segment based on the address; and
execute the second code segment.

2. The multi-core processor of claim 1, wherein the primary processor core is further configured to send, to the secondary processor core through the configuration interface, a status configuration parameter for executing the second code segment, and wherein the secondary processor core is further configured to configure a first parameter based on the status configuration parameter.

3. The multi-core processor of claim 2, wherein the status configuration parameter comprises one or more of a first configuration parameter that is associated with the second code segment and that is stored in a general-purpose register, a second configuration parameter that is associated with the second code segment and that is stored in a system register, or a status setting parameter that affects behavior of running the second code segment by the secondary processor core.

4. The multi-core processor of claim 2, wherein the status configuration parameter comprises a second parameter for accessing in an address read/write mode or comprises an instruction control parameter.

5. The multi-core processor of claim 1, wherein the primary processor core is further configured to send a code execution instruction to the secondary processor core through the configuration interface, and wherein the secondary processor core is further configured to:
- receive the code execution instruction through the configuration interface;
- further load, in response to receiving the code execution instruction, the second code segment based on the address; and
- further execute, in response to receiving the code execution instruction, the second code segment.

6. The multi-core processor of claim 1, wherein the primary processor core is further configured to configure a task exit condition of the secondary processor core through the configuration interface, wherein the task exit condition comprises one or more of a task interrupt condition, a task termination condition, an invalid operation of the secondary processor core, or a priority that the secondary processor core cannot process, and wherein the secondary processor core is further configured to determine, in a process of executing the second code segment and based on the task exit condition, whether to stop executing the second code segment.

7. The multi-core processor of claim 1, wherein the second code segment comprises a task created in a function form in the target program, and wherein the primary processor core is further configured to configure, through the configuration interface, the secondary processor core to execute the second code segment in a function calling mode.

8. The multi-core processor of claim 1, wherein the second code segment comprises a task created in a thread form in the target program, and wherein the primary processor core is further configured to configure, through the configuration interface, the secondary processor core to execute the second code segment in a thread calling mode.

9. The multi-core processor of claim 1, wherein the second code segment comprises a task created in a process form in the target program, and wherein the primary processor core is further configured to configure, through the configuration interface, the secondary processor core to execute the second code segment in a process calling mode.

10. The multi-core processor of claim 1, wherein the second code segment comprises a task created in a virtual machine form in the target program, and wherein the primary processor core is further configured to configure, through the configuration interface, the secondary processor core to execute the second code segment in a virtual machine calling mode.

11. A multi-core processor processing method implemented by a multi-core processor, wherein the multi-core processor processing method comprises:
- executing, using a primary processor core of the multi-core processor, a first code segment in a target program, wherein the target program further comprises a second code segment, and wherein the first code segment is compatible with a first instruction space of the primary processor core;
- sending, using the primary processor core, an address of the second code segment to a secondary processor core, wherein the second processor core comprises a second instruction space that is compatible with the second code segment;
- receiving, using the secondary processor core, the address;
- loading, using the secondary processor core, the second code segment based on the address of the second code segment; and
- executing, using the secondary processor core, the second code segment.

12. The multi-core processor processing method of claim 11, further comprising:
- sending, to the secondary processor core using the primary processor core, a status configuration parameter for executing the second code segment; and
- configuring, using the secondary processor core, a parameter based on the status configuration parameter.

13. The multi-core processor processing method of claim 11, further comprising:
- sending, to the secondary processor core using the primary processor core, a code execution instruction;
- receiving, using the secondary processor core, the code execution instruction;
- further loading, in response to receiving the code execution instruction and using the secondary processor core, the second code segment based on the address; and
- further executing, in response to receiving the code execution instruction and using the secondary processor core, the second code segment.

14. The multi-core processor processing method of claim 13, wherein the status configuration parameter comprises one or more of a first configuration parameter that is associated with the second code segment and that is stored in a general-purpose register, a second configuration parameter that is associated with the second code segment and that is stored in a system register, or a status setting parameter that affects behavior of running the second code segment by the secondary processor core.

15. The multi-core processor processing method of claim 11, further comprising:
- configuring, using the primary processor core, a task exit condition of the secondary processor core, wherein the task exit condition comprises one or more of a task interrupt condition, a task termination condition, an invalid operation of the secondary processor core, or a priority that the secondary processor core cannot process; and
- determining, in a process of executing the second code segment, using the secondary processor core, and based on the task exit condition, whether to stop executing the second code segment.

16. The multi-core processor processing method of claim 11, wherein the second code segment comprises a task created in a function form in the target program, and wherein the multi-core processor processing method further comprises configuring, using the primary processor core, the secondary processor core to execute the second code segment in a function calling mode.

17. The multi-core processor processing method of claim 11, wherein the second code segment comprises a task created in a thread form in the target program, and wherein the multi-core processor processing method further comprises configuring, using the primary processor core, the secondary processor core to execute the second code segment in a thread calling mode.

18. The multi-core processor processing method of claim 11, wherein the second code segment comprises a task created in a process form in the target program, and wherein the multi-core processor processing method further comprises configuring, using the primary processor core, the secondary processor core to execute the second code segment in a process calling mode.

19. The multi-core processor processing method of claim 11, wherein the second code segment comprises a task created in a virtual machine form in the target program, and wherein the multi-core processor processing method further comprises configuring, using the primary processor core, the secondary processor core to execute the second code segment in a virtual machine calling mode.

20. A computer program product comprising computer-executable instructions that are stored on a non-transitory computer-readable storage medium and that, when executed by a multi-core processor, cause an apparatus to:
- execute, using a primary processor core of the multi-core processor, a first code segment in a target program, wherein the target program further comprises a second code segment, and wherein the first code segment is compatible with a first instruction space of the primary processor core;
- send, using the primary processor core, an address of the second code segment to a secondary processor core, wherein the second processor core comprises a second instruction space that is compatible with the second code segment;
- receive, using the secondary processor core, the address;
- load, using the secondary processor core, the second code segment based on the address of the second code segment; and
- execute, using the secondary processor core, the second code segment.

* * * * *